United States Patent
Ataka et al.

(10) Patent No.: US 6,849,164 B2
(45) Date of Patent: Feb. 1, 2005

(54) MAGNETIC RECORDING MEDIUM AND METHOD OF MANUFACTURING THE SAME

(75) Inventors: Toyoji Ataka, Nagano (JP); Yuji Ando, Nagano (JP); Satoru Nakamura, Nagano (JP); Katsuya Masuda, Nagano (JP); Manabu Shimosato, Nagano (JP)

(73) Assignee: Fuji Electric Co., Ltd., Kawasaki (JP)

(*) Notice: Subject to any disclaimer, the term of this patent is extended or adjusted under 35 U.S.C. 154(b) by 26 days.

(21) Appl. No.: 10/141,781

(22) Filed: May 10, 2002

(65) Prior Publication Data

US 2003/0012983 A1 Jan. 16, 2003

(30) Foreign Application Priority Data

May 11, 2001 (JP) .......................................... 2001-142256
Jul. 3, 2001 (JP) .......................................... 2001-202610

(51) Int. Cl.[7] .......................... C23C 14/32; C23C 16/00
(52) U.S. Cl. ............................ 204/192.15; 204/192.2; 427/129; 427/130; 427/131; 427/132
(58) Field of Search ........................ 204/192.15, 192.2; 427/129, 130, 131, 132

(56) References Cited

U.S. PATENT DOCUMENTS 5,302,434 A * 4/1994 Doerner et al. ............. 427/130
5,866,227 A   2/1999 Chen et al. ................ 204/192.2
5,879,783 A   3/1999 Chang et al. ............... 204/192.2
6,582,758 B2 * 6/2003 Sakawaki et al. ............ 427/129

FOREIGN PATENT DOCUMENTS

| JP | 3-194725 | 8/1991 |
|---|---|---|
| JP | 4-013219 | 1/1992 |
| JP | 5-205244 | 8/1993 |
| JP | 6-076279 | 3/1994 |
| JP | 7-121856 | 5/1995 |
| JP | 10-143865 | 5/1998 |
| JP | 2000-020936 | 1/2000 |
| JP | 2000-348334 | 12/2000 |
| JP | 2001-009694 | * 1/2001 |
| JP | 2001-101656 | 4/2001 |

OTHER PUBLICATIONS

English Machine Translation of 2001-009694.*

* cited by examiner

Primary Examiner—Rodney G. McDonald

(57) ABSTRACT

A magnetic recording medium and method of manufacturing the same including directly texturing a surface of a non-magnetic substrate made of a glass material to form circular concentric grooves thereon, forming a seed layer on the non-magnetic substrate, forming an under layer on the seed layer, forming a magnetic layer on the under layer, and forming a protective layer on the magnetic layer. A ratio of an in-plane remanent magnetization in a circumferential direction of the magnetic recording medium to an in-plane remanent magnetization in a radial direction of the magnetic recording medium is equal to or greater than 1.05.

17 Claims, 16 Drawing Sheets

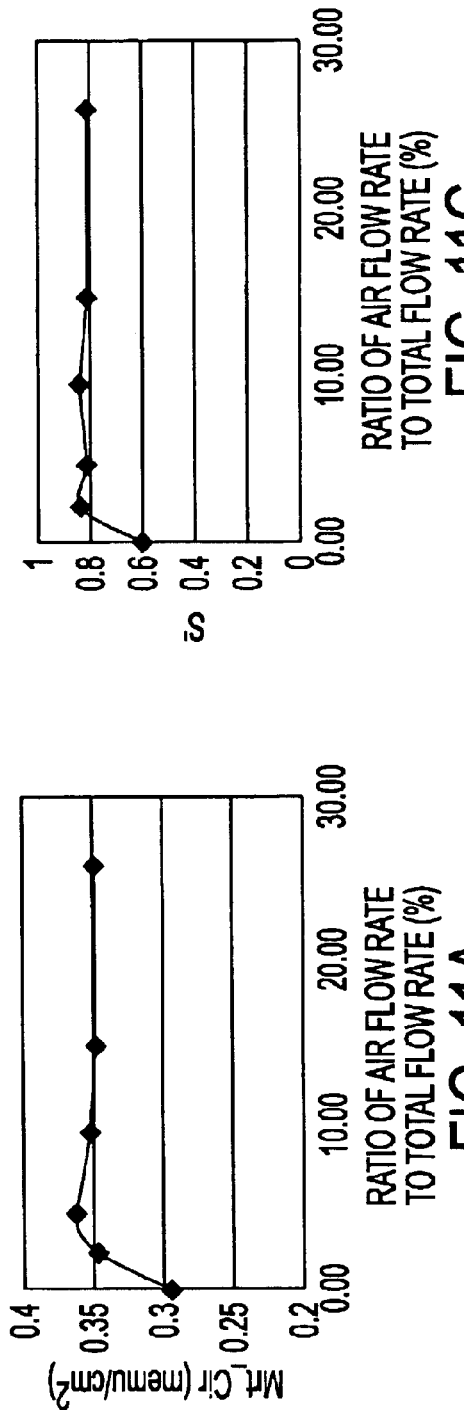
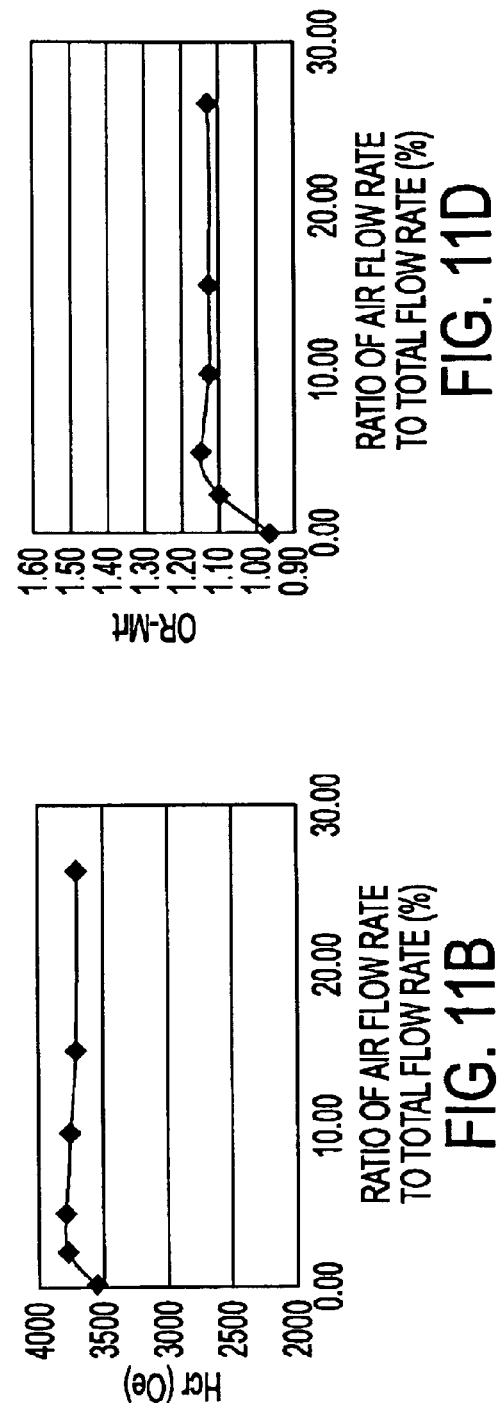

MAGNETIC RECORDING MEDIUM AND METHOD OF MANUFACTURING THE SAME

CROSS-REFERENCE TO RELATED APPLICATIONS

This application claims the benefit of Japanese Application No. 2001-142256, filed May 11, 2001, and Japanese Application No. 2001-202610, filed Jul. 3, 2001, the disclosures of which are incorporated herein by reference.

BACKGROUND OF THE INVENTION

1. Field of the Invention

This invention relates to a magnetic recording medium installed in a variety of magnetic recording devices, such as an external storage of a computer, and a method of manufacturing the same. More particularly, this invention relates to an "anisotropic" magnetic recording medium that is fabricated using a substrate made of a glass material, and a method of manufacturing such a magnetic recording medium in an inexpensive and simple manner.

2. Description of the Related Art

Generally, a magnetic recording medium using a substrate made of an aluminum material is textured to form circular grooves (called "texture") on a surface of the substrate. A seed layer, an under layer, a magnetic layer, and a protective layer are sequentially laminated on the textured substrate. The texturing is intended to prevent the magnetic recording medium from coming into contact with a magnetic head when the magnetic head flies and seeks over the magnetic recording medium, and to raise a recording density by orienting a direction of an in-plane magnetization to a circumferential direction to change the recording medium into a so-called "anisotropic" medium. Usually, the circular grooves are formed on the substrate made with the aluminum material for the magnetic recording medium by plating a blank of aluminum with NiP and texturing the surface of the substrate. A distortion and the circular grooves are caused by a texturing result in a difference in remanent magnetization between the circumferential direction and a radial direction when the under layer and the magnetic layer are formed.

On the other hand, magnetic recording media using substrates made of glass materials are usually so-called "isotropic media" which are not textured for the following reasons: 1) the materials have a high hardness and reliability; 2) the materials have a low thermal expansivity; and 3) even if the substrate is textured as the substrates made of aluminum materials, there is no difference between the remanent magnetization in the circumferential direction and the remanent magnetization in the radial direction. In this specification, the "isotropic medium" means a medium including a ratio of the remanent magnetization in the circumferential direction to the remanent magnetization in the radial direction being substantially 1 (e.g. 0.95 to 1.05), and the "anisotropic medium" means a medium having a ratio of the remanent magnetization in the circumferential direction to the remanent magnetization in the radial direction equal to or greater than 1.05.

With an increase in the recording density of magnetic recording media in recent years, a one-bit recording region (bit size) which is a minimum unit of data written in the recording medium has become smaller and smaller. As described above, the conventional magnetic recording media using glass substrates are mainly isotropic media, but with a decrease in bit size, a difference between the isotropic media and the anisotropic media has become conspicuous because the isotropic media have exhibited a lower resolution (the percentage of an MF output with respect to an LF output) and a deteriorated S/N ratio (SNR: signal-to-noise ratio). Furthermore, because a necessity exists of increasing the remanent magnetization in the circumferential direction (Mrt-Cir) so that the isotropic media can achieve the same characteristics as the anisotropic media, an increase occurs in the thickness of magnetic layers, which results in an increase in media noise generated by the magnetic layers.

To prevent the increase in the media noise in the isotropic media, pure Ar for sputtering has been used for sputtering the base layer to the magnetic layer, and on the other hand, U.S. Pat. No. 5,866,227, incorporated herein by reference, discloses forming a NiP or Ta seed layer in mixed gas of Ar and oxygen by reactive sputtering to improve a crystal orientation of the magnetic layer to lower the noise. Further, U.S. Pat. No. 5,879,783, incorporated herein by reference, discloses exposing a surface of an NiP seed layer to mixed gas of Ar and oxygen and then increasing a surface roughness of the NiP seed layer to, thus, reduce a size of crystal particles in the magnetic layer. These patents, however, as not disclose that the substrate and the surface of the seed layer have in-plane anisotropy in terms of shape. Therefore, magnetic recording media disclosed in these publications have substantially the same value of in-plane remanent magnetization in the circumferential direction and the radial direction of the substrate and have the similar isotropic magnetic characteristics.

SUMMARY OF THE INVENTION

It is therefore an object of the present invention to provide a method of manufacturing a magnetic recording medium having excellent read write characteristics to cope with an increase in recording density by using a glass substrate having an excellent characteristic of having a low thermal expansivity.

It is another object of the present invention to reduce a number of method steps in the above-mentioned method of manufacturing the magnetic recording medium in order to lower a manufacturing cost of the magnetic recording medium.

To accomplish the above and other objects, a method of manufacturing a magnetic recording medium including: directly texturing a surface of a non-magnetic substrate made of a glass material to form circular concentric grooves thereon; forming a seed layer on the non-magnetic substrate; forming an under layer on the seed layer; forming a magnetic layer on the under layer; and forming a protective layer on the magnetic layer, wherein a ratio of an in-plane remanent magnetization in a circumferential direction of the magnetic recording medium to an in-plane remanent magnetization in a radial direction of the magnetic recording medium is equal to or greater than 1.05.

A slurry includes abrasive grains including at least one of diamond, aluminum oxide, cerium oxide, silicon carbide, and colloidal silica to texture the non-magnetic substrate. The abrasive grains have a mean particle diameter of 0.01 to 2 $\mu$m. Further, the abrasive grains in the slurry have a concentration of 0.01 to 5 weight %.

Further, a machining pad excluding abrasive grains and made of a material including at least one of urethane, polyester, and nylon is forced against the non-magnetic substrate, where the machining pad rubs the non-magnetic substrate. Further, the machining pad includes a woven cloth produced by weaving extra fine fibers with a diameter of less than or equal to 10 μm, and a raised cloth formed by raising the woven cloth. Further, the machining pad may be forced against the non-magnetic substrate with a pressure of 9.8 to 196 kPa.

The method of manufacturing the magnetic recording medium may further include exposing the seed layer to a mixed gas (including an inert gas and oxygen prior to forming the under layer, wherein the mixed gas includes the oxygen of at least 0.7 volume %. Alternatively, the method may further include exposing the seed layer to a mixed gas containing inert gas and air (of not less than 2 volume %) prior to forming the under layer. Alternatively, the method may further include exposing the seed layer to the mixed gas containing an inert gas, nitrogen (of not less than 1.6 volume %), and oxygen (of not less than 0.4 volume %) prior to forming the under layer.

In an embodiment of the present invention, the forming of the seed layer further includes forming a portion at a depth of 0.8 to 3 nm from a surface of the seed layer by reactive sputtering in a mixed gas including oxygen of at least 1% in inert gas. In the forming of the seed layer further includes forming a portion at a depth of 0.8 to 3 nm from a surface of the seed layer by reactive sputtering in a mixed gas including air of at least 3% in inert gas. In the forming of the seed layer further includes forming a portion at a depth of 0.8 to 3 nm from a surface of the seed layer by reactive sputtering in a mixed gas including nitrogen of at least 2.4% and oxygen of at least 0.6% in inert gas.

The seed layer is made mainly of NiP. The NiP may contain P of 19 to 33 atomic %. The seed layer may have a thickness of 5 to 28 nm.

In an embodiment of the present invention, the under layer includes a first under layer and a second under layer, the first under layer having a thickness of 3 to 8 nm and the second under layer having a thickness of 1 to 8 nm.

The textured non-magnetic substrate has at least five circular concentric grooves of 1 square μm span on the surface thereof, and has an average surface roughness Ra of 0.2 to 1 nm.

In an embodiment of the present invention, a magnetic recording medium, includes a non-magnetic substrate made of a glass material including a surface textured to form circular concentric grooves thereon, and a seed layer, an under layer on the seed layer, a magnetic layer on the under layer, and a protective layer on the magnetic layer, wherein a ratio of an in-plane remanent magnetization in a circumferential direction of the magnetic recording medium to an in-plane remanent magnetization in a radial direction of the magnetic recording medium is equal to or greater than 1.05.

These together with other objects and advantages, which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

airflow ratio according to an embodiment 10, wherein]

Figure 12A:
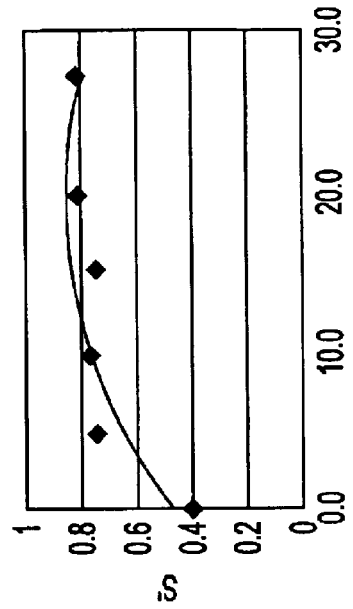
Figure 12B:
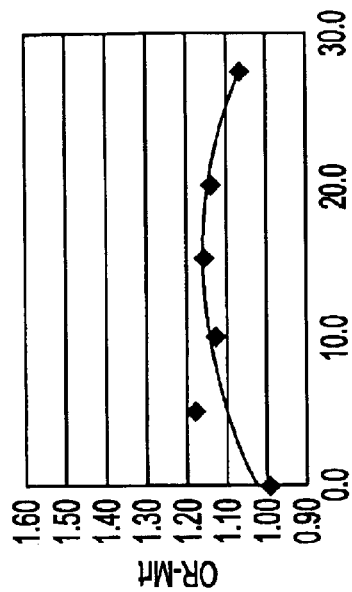
Figure 12C:
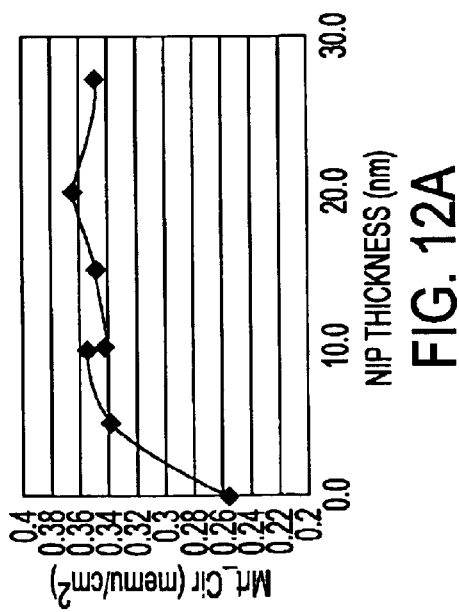
Figure 12D:
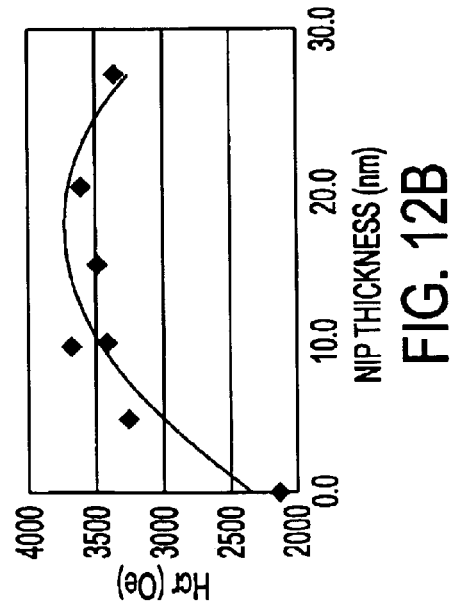
Figure 13A:
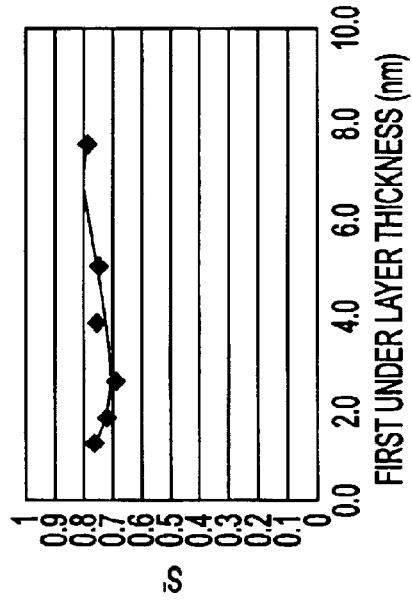
Figure 13C:
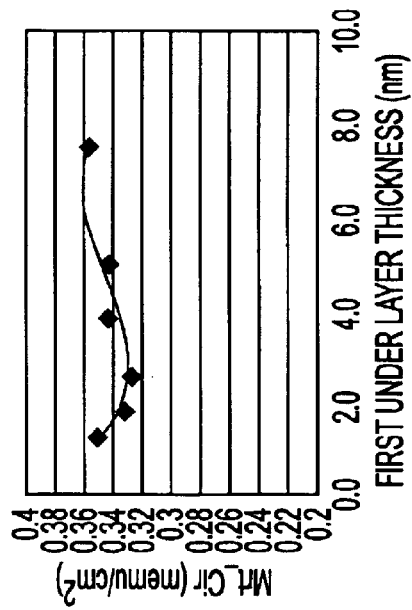
Figure 13B:
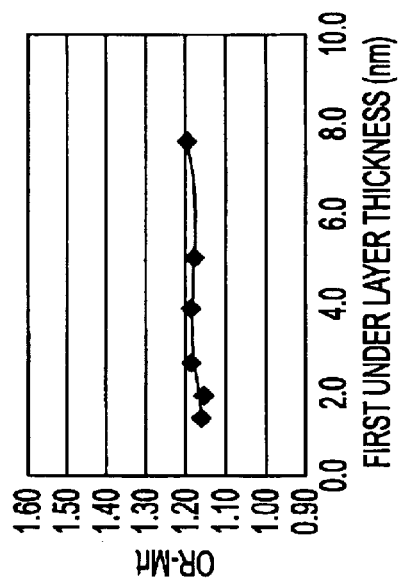
Figure 13D:
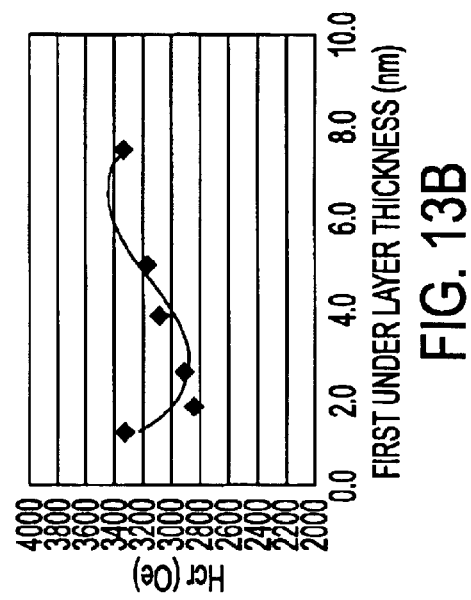

FIG. 11A is a graph showing a dependency of the ratio Mrt_Cir on the oxygen flow rate, according to Example 10 of the present invention;

FIG. 11B is graph showing a dependency of the remanent coercive force Hcr on the oxygen flow rate, according to Example 10 of the present invention;

FIG. 11C is graph showing a dependency of the value S' on the oxygen flow rate, according to Example 10 of the present invention;

FIG. 11D is a graph showing a dependency of the ratio OR-Mrt on an airflow ratio, according to Example 10 of the present invention;

FIG. 12A is a graph showing a dependency of the ratio Mrt_Cir on a seed layer thickness, according to Example 11 of the present invention;

FIG. 12B is graph showing a dependency of the coercive force Hcr on the seed layer thickness, according to Example 11 of the present invention;

FIG. 12C is graph showing a dependency of the value S' on the seed layer thickness, according to Example 11 of the present invention;

FIG. 12D is a graph showing a dependency of the ratio OR-Mrt on the seed layer thickness, according to the eleventh Example of the present invention;

FIG. 13A is a graph showing a dependency of the ratio Mrt_Cir on a First under layer thickness, according to Example 12 of the present invention;

FIG. 13B is graph showing a dependency of the remanent coercive force Hcr on the First under layer thickness, according to Example 12 of the present invention;

FIG. 13C is a graph showing a dependency of the value S' on the First under layer thickness, according to Example 12 of the present invention;

FIG. 13D is a graph showing a dependency of the ratio OR-Mrt on the First under layer thickness, according to Example 12 of the present invention;

under layer thickness in Example 13, wherein]

Figure 14C:
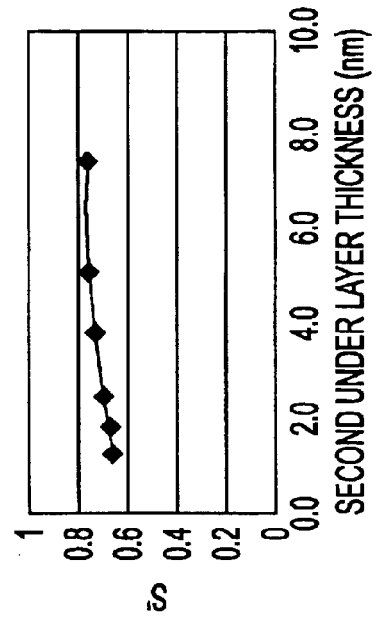
Figure 14D:
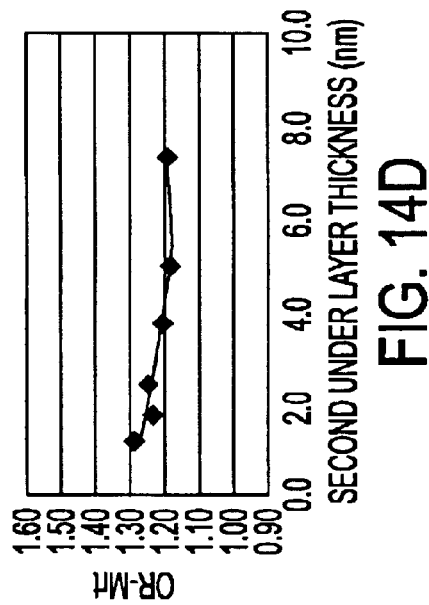
Figure 14A:
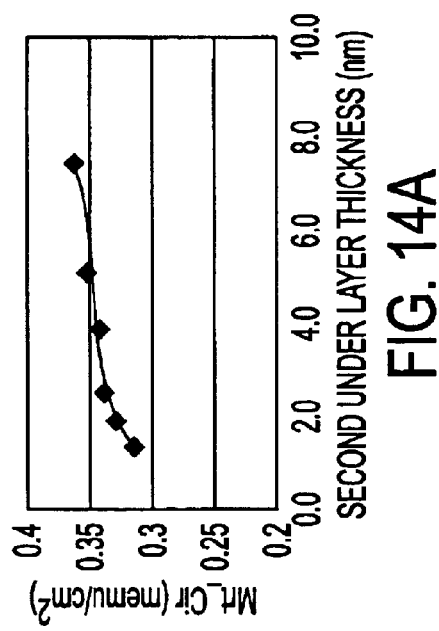
Figure 14B:
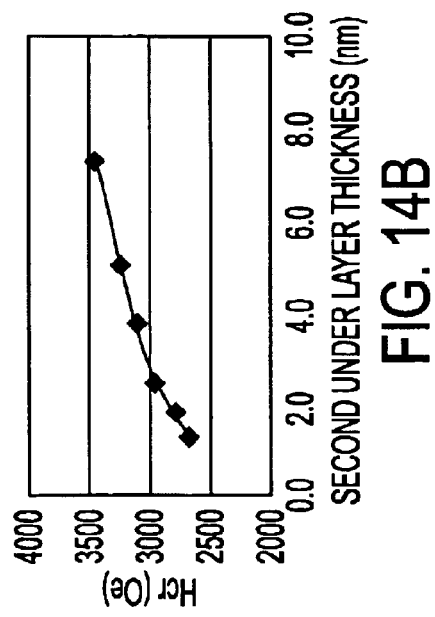
Figure 15A:
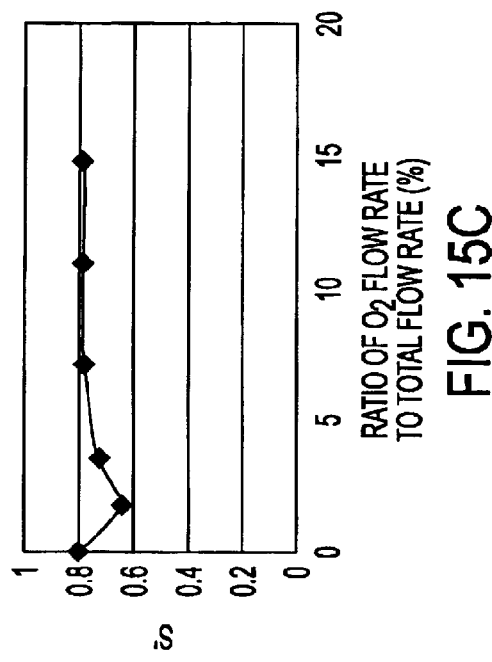
Figure 15B:
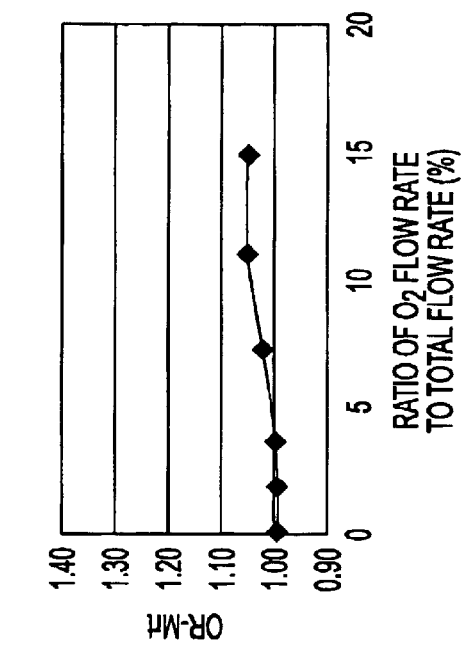
Figure 15C:
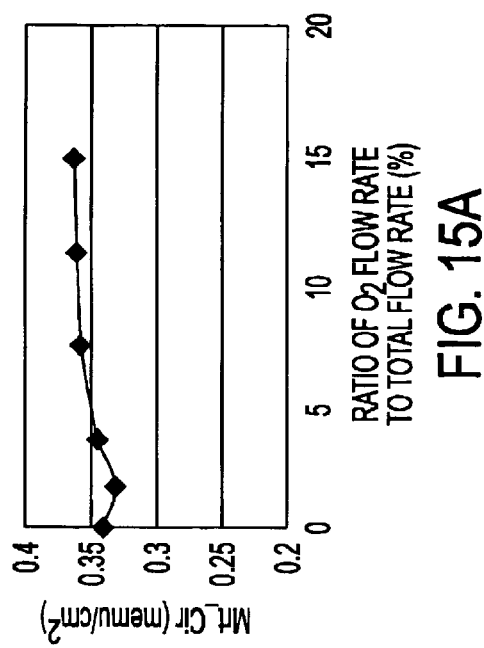
Figure 15D:
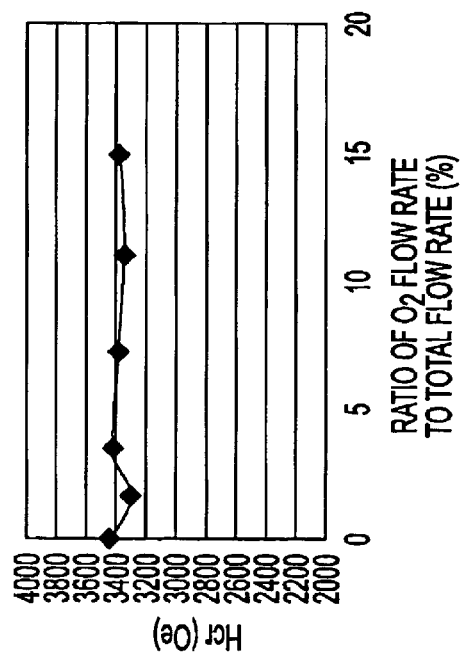
Figure 16A:
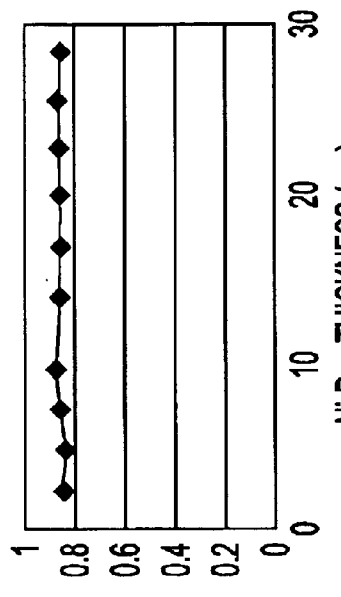
Figure 16B:
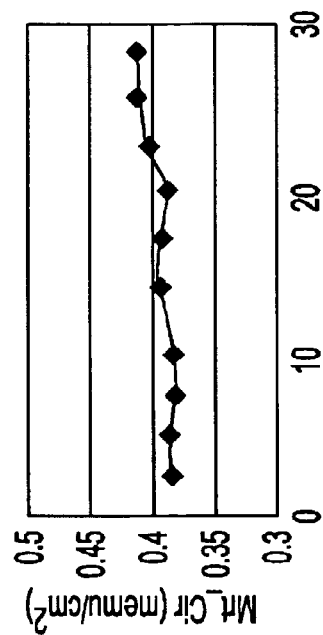
Figure 16C:
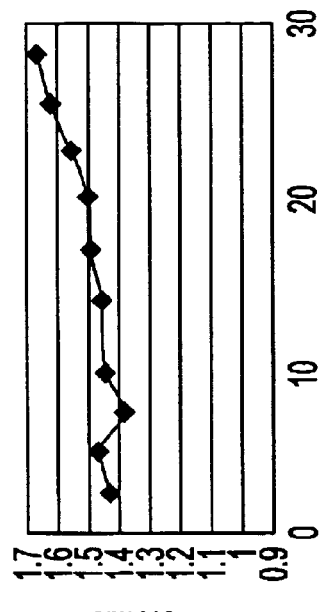
Figure 16D:
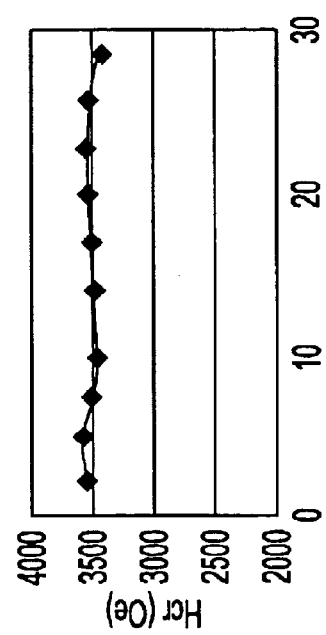
Figure 17:
Figure 18:

FIG. 14A is a graph showing a dependency of the ratio Mrt_Cir on a Second under layer thickness, according to Example 13 of the present invention;

FIG. 14B is graph showing a dependency of the remanent coercive force Hcr on the Second under layer thickness, according to Example 13 of the present invention;

FIG. 14C is graph showing a dependency of the value S' on the Second under layer thickness, according to Example 13 of the present invention;

FIG. 14D is a graph showing a dependency of the ratio OR-Mrt on the Second under layer thickness, according to Example 13 of the present invention;

FIG. 15A is a graph showing the dependency of the ratio Mrt_Cir on the oxygen concentration during reactive sputtering, according to Example 14 of the present invention;

FIG. 15B is graph showing the dependency of the remanent coercive force Hcr on the oxygen concentration during reactive sputtering, according to Example 14 of the present invention;

FIG. 15C is graph showing the dependency of the value S' on the oxygen concentration during reactive sputtering, according to Example 14 of the present invention;

FIG. 15D is a graph showing the dependency of the ratio OR-Mrt on the oxygen concentration during reactive sputtering, according to Example 14 of the present invention;

FIG. 16A is a graph showing a change in the ratio Mrt_Cir, according to Example 16 of the present invention;

FIG. 16B is graph showing a change in the remanent coercive force Hcr, according to Example 16 of the present invention;

FIG. 16C is graph showing a change in the value S', according to Example 16 of the present invention;

FIG. 16D is a graph showing a change in the ratio OR-Mrt, according to Example 16 of the present invention;

FIG. 17 is a view showing a TEM image of a magnetic recording medium manufactured by a method, according to Example 16 of the present invention; and FIG. 18 is a view showing a TEM image of a magnetic recording medium manufactured by a method, according to Example 17 of the present invention.

DETAILED DESCRIPTION OF THE PREFERRED EMBODIMENTS

In a method of manufacturing a magnetic recording medium according to exemplary embodiments of the present invention, a substrate made of a glass material is mechanically textured to form concentric grooves in a circumferential direction. A seed layer, an under layer, a magnetic layer, and a protective layer are formed on the substrate. As a need arises, a lubricant layer formed of a liquid lubricant may be provided on the protective layer.

Any kind of glass (e.g. N5 or N10 substrate made by Hoya Corp. or GD7 substrate made by Nippon Sheet Glass Co., Ltd.) may be used as a material for the substrate insofar as the glass has required characteristics, such as a surface smoothness and rigidity. Particularly, the glass may be a tempered amorphous glass. The substrate may be shaped in a circular form with a circular hole at the center thereof. A diameter of the circular hole at a center and an outer diameter of the substrate can easily be determined by those skilled in the art according to a purpose of use. The substrate may have a thickness of 0.635 to 1.6 mm, and may be for instance, 0.635 to 1 mm.

According to exemplary embodiments of the present invention, the seed layer is intended to achieve the desired characteristics of the magnetic recording medium by controlling the orientation and/or grain diameter of crystals in a layer formed on the seed layer. Cr, CrW, NiP, or Ta may be used as a material for the seed layer. For instance, NiP may be used including P of 19 to 33 atomic %, and may be for instance, 19 to 28.6 atomic %. According to exemplary embodiments of the present invention, the seed layer may have a two-layered structure. If the seed layer has the two-layered structure, a first seed layer in contact with the substrate may be formed of Cr or CrW and a second seed layer in contact with the first seed layer, may be formed, for instance, of NiP. The seed layer, according to exemplary embodiments of the present invention, may be formed by laminating the above-mentioned material by a conventional method, such as sputtering, deposition, CVD, or plating. The sputtering method may be adopted considering that other layers are formed at the same time as the formation of the seed layer. The seed layer of the magnetic recording medium, according to exemplary embodiments of the present invention, may have a thickness of 5 to 28 nm, and, in particular, 7 to 28 nm. If the seed layer has the two-layered structure, the first seed layer may have a thickness of 1 to 2 nm and the second seed layer may be held in the above-mentioned range.

The under layer, according to exemplary embodiments of the present invention, is intended to achieve the desired characteristics of the magnetic recording medium by controlling a crystal orientation and/or a crystal grain diameter of the magnetic layer formed on the under layer. Cr, CrW alloy, or CrMo alloy may be used as a material for the under layer. The under layer, according to exemplary embodiments of the present invention, may be formed by laminating Cr, CrW alloy, or CrMo on the substrate using a conventional method such as sputtering, deposition, or CVD. The sputtering method may be adopted, for instance, considering that other layers are formed at the same time as the formation of the under layer. The under layer of the magnetic recording medium, according to exemplary embodiments of the present invention, may have a thickness of 3 to 10 nm, and for instance, 3 to 8 nm.

The under layer, according to exemplary embodiments of the present invention, may have a plural-layer structure. The under layer may have a two-layered structure including a first under layer and a second base layer. The first under layer increases a ratio OR-Mrt (=Mrt_Cir/Mrt_Rad) and may be formed of a CrW alloy or CrMo alloy containing a second element with a low concentration (e.g. 10 atomic % or lower). The second under layer supports an epitaxial growth of the magnetic layer, and may be formed of a CrW alloy or CrMo alloy containing the second element with a high concentration (e.g. 15 atomic % or higher). The first under layer and the second under layer may be formed by a conventional method, such as sputtering, deposition, or CVD. The sputtering method may be adopted considering that other layers are formed at the same time as the formation of the under layer. The first under layer may have a thickness of 3 to 8 nm, and, for instance, 3 to 5 nm. The second under layer may have a thickness of 1 to 5 nm, and for instance, 1 to 3 nm.

The magnetic layer according to exemplary embodiments of the present invention may be formed of a magnetic material composed mainly of Co. Examples of the magnetic material are a CoCr alloy, CoCrTa alloy, CoNiCr alloy, CoCrPt alloy, CoCrPtTa alloy, CoNiPt alloy, CoNiCrPt alloy, and CoCrPtB alloy. The magnetic layer, according to exemplary embodiments of the present invention, may be formed by laminating the above-mentioned material on the substrate by a conventional method, such as sputtering, deposition, or CVD. Considering that other layers are formed at the same time as the formation of the magnetic layer, the sputtering method may be adopted. The magnetic layer of the magnetic recording medium according to exemplary embodiments of the present invention may have a thickness of 5 to 20 nm, for instance, 8 to 15 nm.

The protective layer, according to exemplary embodiments of the present invention, is intended to prevent the layer formed under the protective layer from breaking down due to a contact with a head. Examples of materials for the protective layer are carbon (C), silicon carbide (SiC), zirconium oxide ($ZrO_2$), and carbon nitride (CN). Diamond-like carbon (DLC) may be used as the carbon (C) material. The protective layer, according to exemplary embodiments of the present invention, may be formed by laminating the above-mentioned material on the substrate by a conventional method, such as sputtering, deposition, or CVD. Considering that other layers are formed at the same time as the formation of the protective layer, the sputtering method may be adopted. The protective layer of the magnetic recording medium, according to exemplary embodiments of the present invention, may have a thickness of 1 to 30 nm, and for instance, 2 to 4 nm.

If sputtering forms the under layer and the magnetic layer, a DC or a RF bias may be applied to the substrate. According to exemplary embodiments of the present invention, the lubricant layer that may be arbitrarily provided is formed by adhering a liquid lubricant thereto by a conventional method such as spin coating, jetting, immersing, or knife-coating. The lubricant layer is intended to reduce the friction between the head and the magnetic recording medium when they are brought into contact with each other. A conventional lubricant, such as a fluorocarbon lubricant, may be used as the liquid lubricant. In the case where the lubricating layer is provided, the lubricating layer may have a thickness of 0.5 to 5 nm, and, for instance, 1 to 2 nm.

In a method of manufacturing the magnetic recording medium according to exemplary embodiments of the present invention, the substrate may be polished first to achieve a desired surface roughness. The substrate may be polished by an arbitrary method known in the field of the art to which the present invention pertains. According to exemplary embodiments of the present invention, the desired average surface roughness Ra may be 0.2 to 1 nm, for instance, 0.2 to 0.5 nm. The substrate having the desired surface roughness is then mechanically textured to form the concentric grooves thereon in the circumferential direction. The substrate is textured by pressing a machining pad without abrasive grains against the surface of the substrate, adhering an abrasive slurry to the surface of the substrate, and rotating the substrate. The substrate may be textured using a long or rolled machining pad that is fed such that a clean portion thereof can always be in contact with the substrate. A jig or the like known in the field of the art to which the present invention pertains may be used to press the machining pad against the substrate. The machining pad may be pressed against the surface of the substrate with a pressure of 9.8 to 196 kPa (100 to 2000 gf/$cm^2$), and for instance, 9.8 to 98 kPa (100 to 1000 gf/$cm^2$). On this occasion, the pressure that is actually applied to the surface of the substrate may be 3.9 to 78.4 kPa (40 to 80 gf/$cm^2$), and for instance, 3.9 to 39.2 kPa (40 to 400 gf/$cm^2$).

The machining pad that includes no abrasive grains and is used for texturing may be formed of urethane, polyester, or nylon. If the machining pad is formed of such a material, a woven cloth produced by weaving extra fine fibers with a diameter of not greater than 10 $\mu$m may be used. A raised cloth produced by raising the woven cloth may also be used.

The slurry used for texturing includes abrasive grains of one kind including one of the following: diamond, aluminum oxide, cerium oxide, silicon carbide, and colloidal silica. The abrasive grains may have a mean particle diameter of 0.01 to 2 $\mu$m, and for instance, 0.05 to 1.5 $\mu$m. The abrasive grains are included in the slurry with a concentration of 0.01 to 5 weight % based on a total weight of the slurry.

Five or more, for instance, five to one hundred, or for instance, twenty-five to sixty circular concentric grooves are formed of 1 square $\mu$m span in, the surface of the substrate textured as described above. The number of formed grooves can be measured using a scanning electron microscope (SEM) or an interatomic force microscope (AFM). If the number of grooves formed per 1 square $\mu$m span in the surface of the substrate is less than five, it is impossible to achieve desired remanent magnetization anisotropy. The grooves formed on the substrate have a depth of 1 to 10 nm, and more preferably, 3 to 5 nm. If the depth of the grooves is less than 1 nm, it is impossible to achieve a desired remanent magnetization anisotropy, and on the other hand, if the depth of the grooves is greater than 10 nm, it may give an adversary effect on other characteristics of the magnetic recording medium (i.e. the signal quality (error characteristic) of the magnetic recording medium).

Further, in the method of manufacturing the magnetic recording medium according to exemplary embodiments of the present invention, the seed layer may be exposed to mixed gas containing oxygen and inert gas between a step of forming the seed layer and the step of forming the under layer. Examples of the inert gas are He, Ne, Ar, Xe, and Kr, and particularly, Ar may be used. The source of oxygen may be either pure oxygen or air. It is possible to use a mixed gas containing an inert gas (preferably Ar) and a content of oxygen of not less than 0.7 volume % based on a total volume of the mixed gas. The oxygen content may be held in a range of 1 to 4 volume %. It is also possible to use mixed gas containing inert gas (for instance, Ar) and the air of not less than 2 volume % based on the total volume of the mixed gas. The air content may be held in a range of 2 to 10 volume %. It is also possible to use a mixture of pure oxygen and nitrogen in place of the air. In this case, it is possible to use mixed gas containing oxygen of not less than 0.4 volume % based on the total volume of the mixed gas and nitrogen of not less than 1.6 volume % based on the inert gas. In this case, the oxygen content may be held in a range of 0.4 to 2 volume %, and the nitrogen content may be held in a range of 1.6 to 8 volume %. A ratio of the oxygen content to the nitrogen content may be about 1:4, and, for instance, between 1:3.9 and 1:4.

In the method of manufacturing the magnetic recording medium according to exemplary embodiments of the present invention, it is also possible to form an outermost surface of the seed layer by reactive sputtering in mixed gas containing oxygen and inert gas. The mixed gas may be the above-described one. In this description, the "outermost surface of the seed layer" means a portion at a depth of not greater than 3 nm (about 15% of the total thickness of the seed layer) from the surface of the seed layer, on which the under layer may be formed (in the formation of the seed layer), for instance, a portion at a depth of 0.8 to 3 nm (about 4 to 15% of the total thickness of the seed layer). More specifically, a formation of the seed layer starts by sputtering in an atmosphere of pure inert gas, and at a point in time when the seed layer with a predetermined thickness is laminated, the introduction of the oxygen, the air, or the oxygen+the nitrogen starts to laminate the "outermost surface of the seed layer" by reactive sputtering.

In the magnetic recording medium manufactured by the method, according to exemplary embodiments of the present invention, the ratio (Or-Mrt) of the in-plane circumferential remanent magnetization to the in-plane radial remanent magnetization is not less than 1.05, and for instance, not less than 1.1. In this specification, the in-plane remanent magnetization (Mrt) means a value that is obtained by dividing a measured remanent magnetization (Mr) by a film area, and "Or-Mrt" means a ratio (Mrt_Cir/Mrt_Rad) of a circumferential remanent magnetization (Mrt_Cir) to a radial remanent magnetization (Mrt_Rad).

In the following description of examples, the composition of an alloy is referred to as "ABx", which means that the alloy includes "B" of x atomic % based on a total number of atoms and "A" as the rest.

EXAMPLE 1

Figure 1:
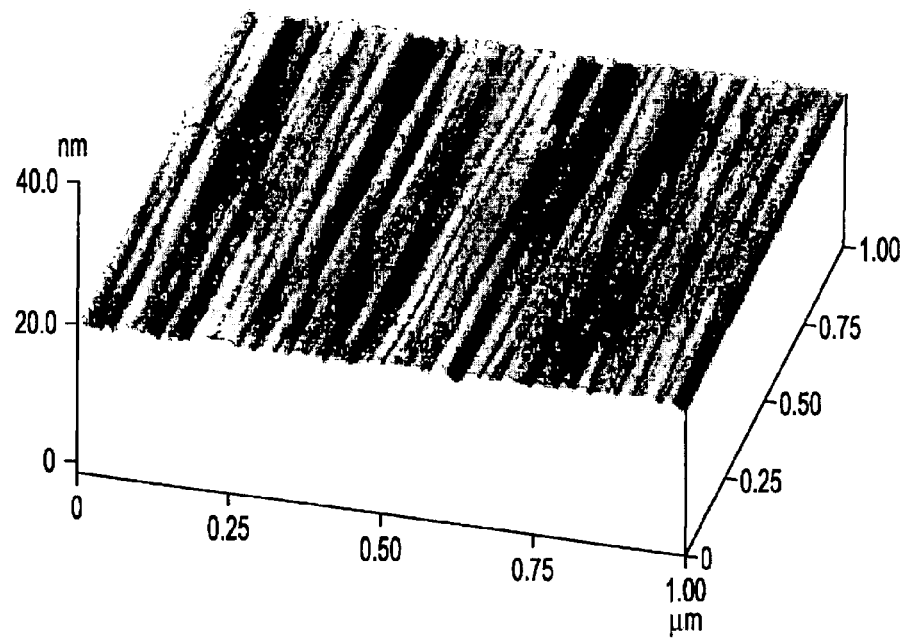
FIG. 1 is a view showing an AFM image (observation of 1 μm×1 μm span) of a textured substrate, according to Example 1 of the present invention.

A surface of a tempered amorphous glass substrate (N5 substrate made by Hoya Corp.) is polished to obtain an average surface roughness Ra of 0.5 nm. The substrate is secured to a spindle with a chuck and rotated at a speed of 300 rpm, and a woven cloth made of polyester extra fine fibers (with a fiber diameter of about 1.5 $\mu$m) is fed at a speed of 60 mm/min and forced against the substrate via a pressing member with a rubber hardness (spring type hardness in an IRHD pocket hardness test mentioned in JIS K6253) of 80° with a pressure of 196 kPa (2 kgf/cm$^2$). The substrate is grounded (textured) for twenty seconds with a drop of slurry including 0.1 weight % diamond abrasive grains with a mean grain diameter of 0.1 $\mu$m. On this occasion, a pressure of 78.5 kPa (80 gf/cm$^2$) is applied to the surface of the substrate. A shape of the surface of the textured substrate in 1 square $\mu$m span is measured using an AFM to find a number of grooves formed on the surface and the average surface roughness. FIG. 1 shows an AFM image of the surface of the textured substrate.

The substrate is then cleaned, and a CrW seed layer (CrW$_{16}$ with a thickness of 2 nm) and a NiP seed layer (NiP$_{20}$ with a thickness of 7 nm) are laminated on the substrate using a DC sputtering machine. Subsequently, an under layer composed of Cr (with a thickness of 3.8 nm) and CrMo$_{25}$ (with a thickness of 2.5 nm), a magnetic layer including CoCrPt (with a thickness of 12 nm) and a C protective layer (with a thickness of 4 nm) are formed after heating. Between a step of forming the NiP seed layer and a step of the under layer, the seed layer is exposed to an Ar+O$_2$ mixed gas containing oxygen (O$_2$) (with an oxygen concentration of 2 volume %, 1.3 Pa (10 mTorr), 2.5 seconds). Magnetic characteristics of the three kinds of the magnetic recording media manufactured in the above-mentioned manner are evaluated using a magnetic measuring instrument called an ORM measuring instrument (ORM made by Innovative Instrumentation, Inc.). The evaluated magnetic characteristics are the remanence coercive force Hcr, a value Mrt that is found by dividing the remanent magnetism (Mr) by a film area, the ratio OR-Mrt (=Mrt_Cir/Mrt_Rad) of Mrt in the circumferential direction to Mrt in the radial direction, and S' (the inclination of a remanence curve at the point of Hcr).

EXAMPLE 2

Figure 2:
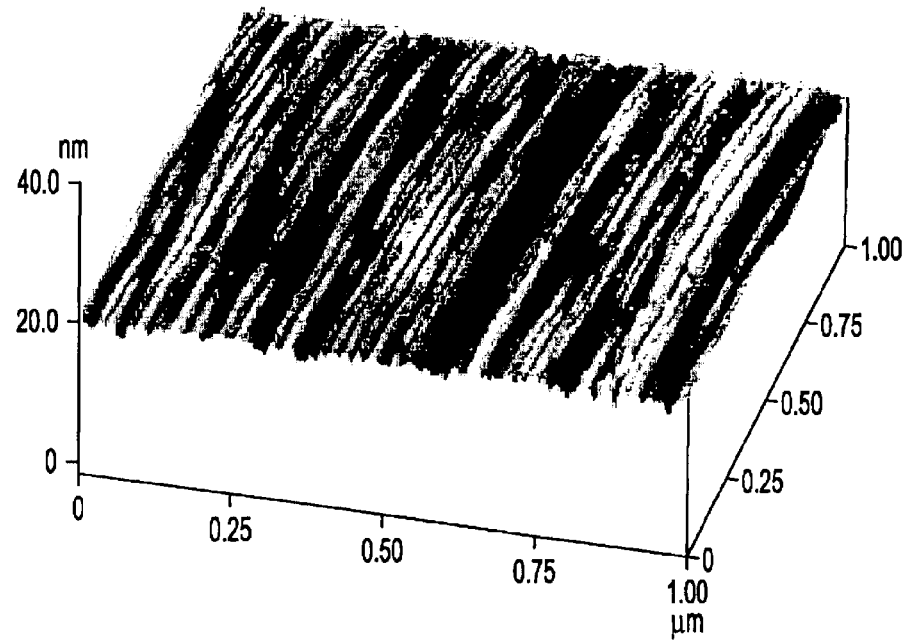
FIG. 2 is a view showing an AFM image (observation range of 1 μm×1 μm span) of a textured substrate, according to Example 2 of the present invention.

In Example 2, the magnetic recording medium is produced in a same manner as in Example 1 above, except that a machining pad is pressed against a substrate with a pressure of 98.1 kPa (1 kgf/cm$^2$). A pressure of 39.2 kPa (400 g/cm$^2$) is applied to the surface of the substrate. FIG. 2 shows an AFM image of the surface of the textured substrate.

Comparative Example 1

Figure 3:
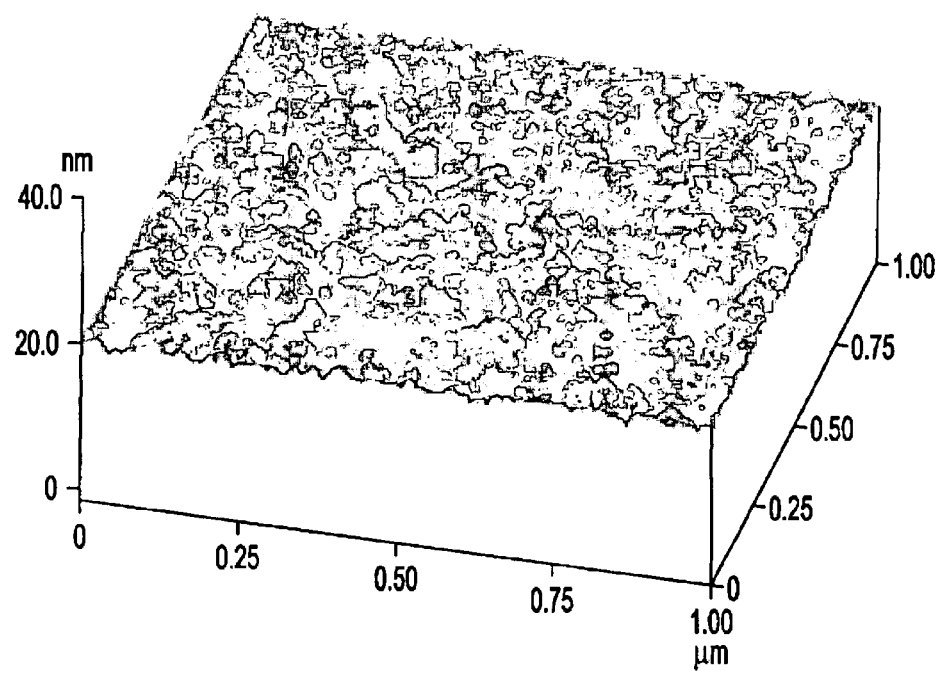
FIG. 3 is a view showing an AFM image (observation range of 1 μm×1 μm span) of a substrate of Comparative Example 1.

In Comparative Example 1, the magnetic recording medium is produced in the same manner as in Example 1 above, except that the substrate is not textured at all. FIG. 3 shows the AFM image of the surface of the substrate.

Table 1 shows the evaluated magnetic characteristics of Examples 1, 2 and Comparative Example 1. It should be noted that 1 Oe is equal to 79.6 A/m in a following Table 1.

|  | Ex. 1 | Ex. 2 | Com. Ex. 1 |
|---|---|---|---|
| Pressure applied to surface of substrate | 78.5 Pa | 39.2 kPa | Not machined |
| Number of circular concentric grooves per 1 $\mu$m | 30 | 55 | 0 |
| Average surface roughness Ra of 1 square $\mu$m span | 0.46 nm | 0.45 nm | 0.47 nm |
| Hcr (Oe) | 3610 | 3580 | 3598 |
| Mrt_Cir (mimu/cm$^2$) | 0.40 | 0.41 | 0.361 |
| Or-Mrt | 1.23 | 1.38 | 0.99 |
| S' | 0.82 | 0.84 | 0.95 |

EXAMPLE 3

Figure 4:
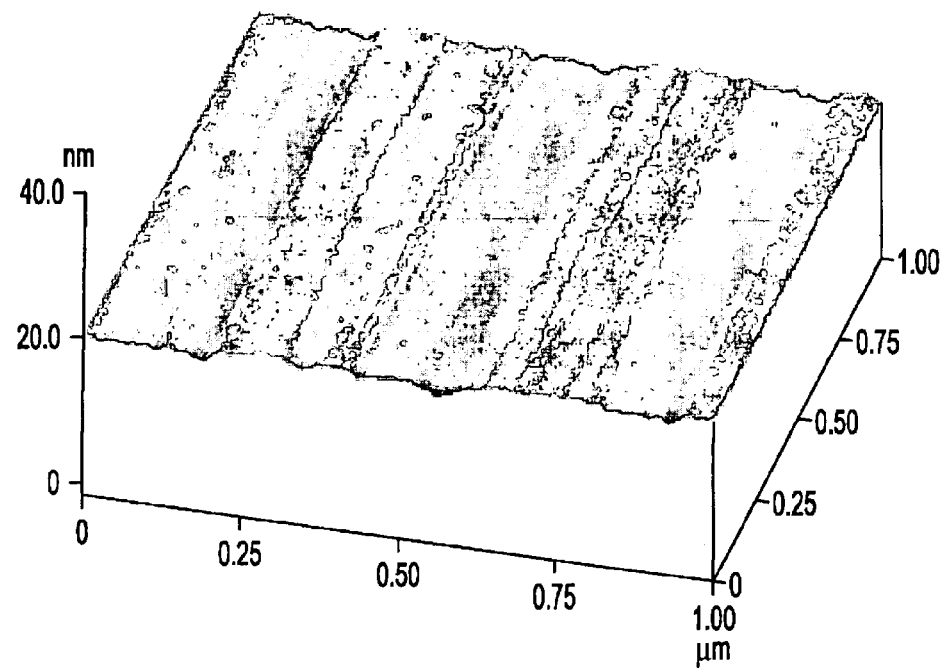
FIG. 4 is a view showing an AFM image (observation range of 1 μm×1 μm span) of a textured substrate, according to Example 3 of the present invention.

The surface of a tempered amorphous glass substrate (N5 substrate made by Hoya Corp.) is polished to obtain an average surface roughness Ra of 0.5 nm. The substrate is secured to a spindle with a chuck and rotated at a speed of 300 rpm. A woven cloth made of polyester extra fine fibers (with a diameter of about 1.5 $\mu$m) including no abrasive grains is fed at a speed of 60 mm/min via a pressing member with a rubber hardness of 60°, and is forced against the substrate with a pressure of 98.1 kPa (1 kgf/cm$^2$), so that the substrate is grounded (textured) for sixty seconds with drop of a slurry containing diamond grains of 0.1 weight % with a mean particle diameter of 0.4 $\mu$m. In this instance, a pressure of 29.4 kPa (300 gf/cm$^2$) is applied to the surface of the substrate. The shape of the surface of the textured substrate per 1 square $\mu$m span is measured using an AFM, and the number of circular concentric grooves formed in the surface and the average surface roughness are found. FIG. 4 shows an AFM image of the surface of the textured substrate.

The substrate is then cleaned, and a CrW seed layer (CrW$_{16}$ with a thickness of 2 nm) and a NiP seed layer (NiP$_{28}$ with a thickness of 15 nm) is laminated over the substrate by a DC sputtering machine. The substrate is then heated to form an under layer composed of Cr (with a thickness of 3.8 nm) and CrMo$_{25}$ (with a thickness of 2.5 nm), a magnetic layer (with a thickness of 12 nm) containing CoCrPt, and a C protective layer (4 nm). Between a step of forming the NiP seed layer and a step of forming the under layer, the seed layer is exposed to an Ar+O$_2$ mixed gas containing oxygen (O$_2$) (oxygen concentration of 2 volume %, 1.3 Pa (10 mTorr), for 2.5 seconds). The magnetic characteristics of the magnetic recording medium thus manufactured are evaluated using an ORM measuring instrument. Table 2 shows the evaluated magnetic characteristics.

|  | Ex. 3 | Com. Ex. 1 |
|---|---|---|
| Pressure applied to surface of substrate | 29.4 kPa | Not machined |
| Number of circular concentric grooves per 1 μm | 18 | 0 |
| Average surface roughness Ra per 1 square μm span | 0.3 nm | 0.47 nm |
| Hcr (Oe) | 3450 | 3180 |
| Mrt_Cir (mimu/cm$^2$) | 0.34 | 0.31 |
| Or-Mrt | 1.12 | 0.98 |
| S' | 0.75 | 0.70 |

EXAMPLE 4

Figure 5:
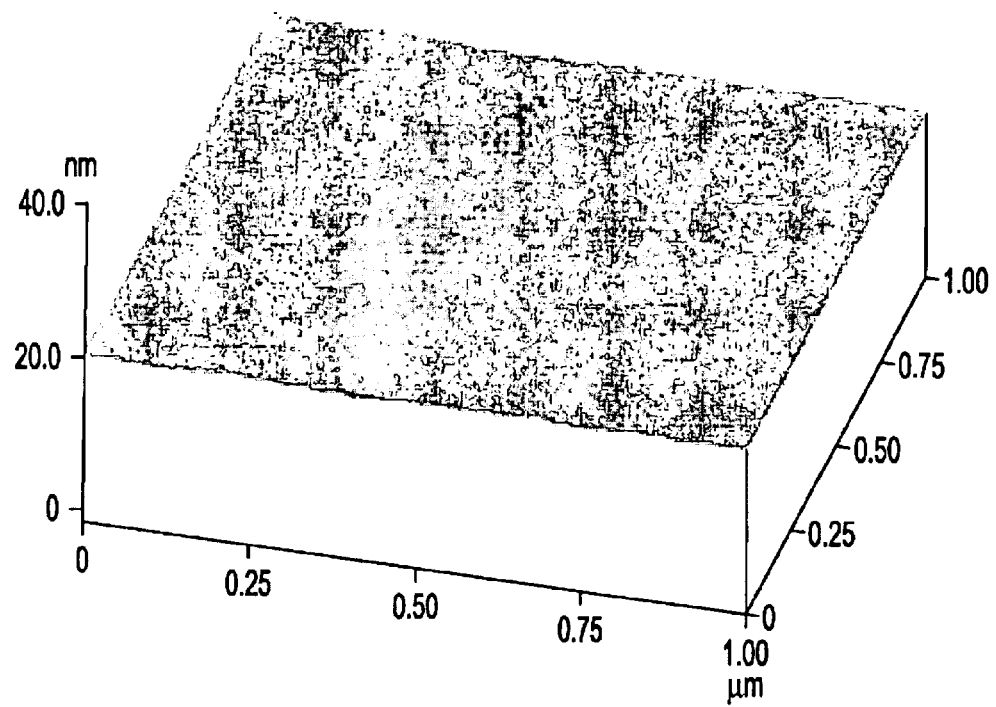
FIG. 5 is a view showing an AFM image (observation of 1 μm×1 μm span) of a textured substrate, according to Example 4 of the present invention.

The surface of a tempered amorphous glass substrate (N5 substrate made by Hoya Corp.) is polished to obtain an average surface roughness Ra of 0.5 nm. The substrate is secured to a spindle with a chuck and rotated at a speed of 300 rpm. A tape made of urethane foam containing no abrasive grains is fed at a speed of 25 mm/min, and is forced against the substrate with a pressure of 98.1 kPa (1 kgf/cm$^2$) via a pressing member made by SUS, so that the substrate is grounded (textured) for sixty seconds with drop of a slurry including diamond grains of 0.1 weight % with a mean particle diameter of 0.4 μm. On this occasion, a pressure of 9.81 kPa (100 gf/cm$^2$) is applied to the surface of the substrate. The shape of the surface of the textured substrate per 1 square μm span is measured using an AFM, and the number of circular concentric grooves formed in the surface and the average surface roughness Ra are found. FIG. 5 shows an AFM image of the surface of the textured substrate.

The substrate is then cleaned, and a CrW seed layer (CrW$_{16}$ with a thickness of 2 nm) and a NiP seed layer (NiP$_{28.6}$ with a thickness of 15 nm) are laminated on the substrate by a DC sputtering machine. The substrate is then heated to form an under layer including Cr (with a thickness of 5 nm) and CrMo$_{25}$ (with a thickness of 5 nm), a magnetic layer (with a thickness of 12 nm) containing CoCrPt, and a C protective layer (4 nm). Between a step of forming the NiP seed layer and a step of forming the under layer, the seed layer is exposed to an Ar+O$_2$ mixed gas containing oxygen (O$_2$) (oxygen concentration of 2 volume %, 1.3 Pa (10 mTorr), 2.5 seconds). The magnetic characteristics of a magnetic recording medium thus manufactured are evaluated using the ORM measuring instrument. Table 3 shows the evaluated magnetic characteristics.

|  | Ex. 4 | Com. Ex. 1 |
|---|---|---|
| Pressure applied to surface of substrate | 9.81 kPa | Not machined |
| Number of circular concentric grooves per 1 μm | 5 | 0 |
| Average surface roughness Ra per 1 square μm span | 0.22 nm | 0.47 nm |
| Hcr (Oe) | 3070 | 3180 |
| Mrt_Cir (mimu/cm$^2$) | 0.33 | 0.31 |
| Or-Mrt | 1.05 | 0.98 |
| S' | 0.68 | 0.70 |

EXAMPLE 5

The surface of a tempered amorphous glass substrate (N5 substrate produced by Hoya Corp.) is polished to obtain an average surface roughness Ra of 0.5 nm. The substrate is secured to a spindle with a chuck and rotated at a speed of 300 rpm. A woven cloth made of polyester extra fine fibers (with a diameter of about 1.5 μm) including no abrasive grains is fed at a speed of 60 mm/min, and is forced against the substrate with a pressure of 98.1 kPa (1 kgf/cm$^2$) via a pressing member with a rubber hardness of 60°. Accordingly, the substrate is grounded (textured) for texturing time of 20 to 60 seconds with drop of a slurry including diamond grains of 0.1 mass % with a mean particle diameter of 0.1 μm. On this occasion, a pressure of 39.21 kPa (400 gf/cm$^2$) is applied to the surface of the substrate. The shape of the surface of the textured substrate per 1 square μm span is measured using an AFM, and the number of circular concentric grooves formed on the surface and the average surface roughness are found.

The substrate is then cleaned, and a CrW seed layer (CrW$_{16}$ with a thickness of 2 nm) and a NiP seed layer (NiP$_{28.6}$ with a thickness of 7 nm) are laminated on the substrate by a DC sputtering machine. The substrate is then heated to form a under layer including Cr (with a thickness of 3.8 nm) and CrMo$_{25}$ (with a thickness of 2.5 nm), a magnetic layer (with a thickness of 12 nm) containing CoCrPt, and a C protective layer (4 nm). Between a step of forming the NiP seed layer and a step of forming the under layer, the seed layer is exposed to an Ar+O$_2$ mixed gas containing oxygen (O$_2$) (oxygen concentration of 2 volume %, about 1.3 Pa (10 mTorr), 2.5 seconds). The magnetic characteristics of a magnetic recording medium thus manufactured are evaluated using the ORM measuring instrument. Table 4 shows the evaluated magnetic characteristics.

Figure 6C:
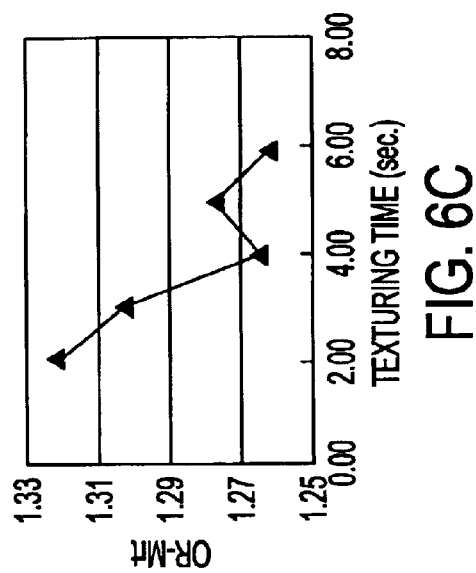
FIG. 6C is a graph showing a seventh Example of a relationship between the texturing time and a ratio OR-Mrt of a magnetic recording medium, according to Example 5 of the present invention.
Figure 6A:
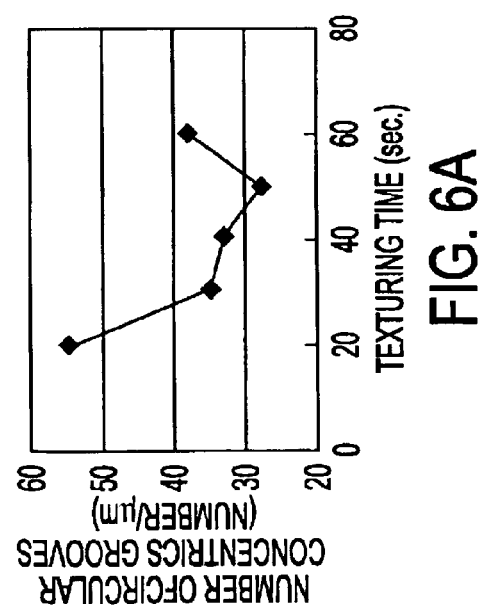
FIG. 6A is a graph showing a relationship between a texturing time and a number of circular concentric grooves per 1 μm of a surface of a substrate, according to Example 5 of the present invention.
Figure 6B:
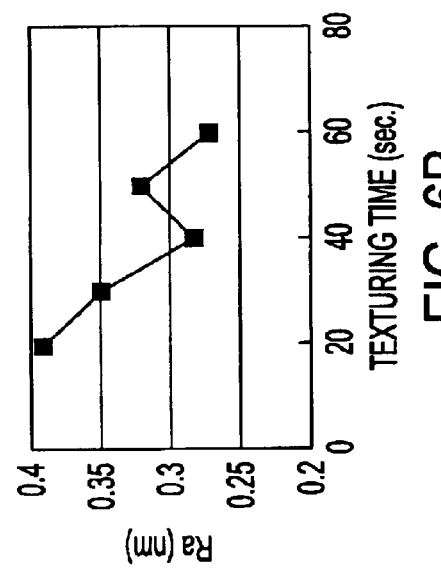
FIG. 6B is a graph showing a sixth Example of a relationship between the texturing time and the average surface roughness Ra per 1 square μm span of the surface of the substrate, according to Example 5 of the present invention.

FIGS. 6A, 6B, and 6C show a relationship between a texturing time and evaluated characteristics. FIG. 6A is a graph showing the relationship between the texturing time and the number of circular concentric grooves per 1 square μm span, FIG. 6B is a graph showing the relationship between the texturing time and the average surface roughness Ra per 1 square μm of the surface of the substrate, and FIG. 6C is a graph showing the relationship between the texturing time and the ratio Ort-Mrt of the magnetic recording medium.

| Texturing time | 20 sec. | 30 sec. | 40 sec. | 50 sec. | 60 sec. |
|---|---|---|---|---|---|
| Number of circular concentric grooves per 1 μm | 55 | 35 | 33 | 28 | 38 |
| Average surface roughness Ra per 1 square μm span | 0.39 nm | 0.35 nm | 0.283 nm | 0.321 mm | 0.271 mm |
| Hcr (Oe) | 3760 | 3750 | 3730 | 3800 | 3770 |
| Mrt_Cir (memu/cm$^2$) | 0.40 | 0.41 | 0.40 | 0.52 | 0.52 |
| Or-Mrt | 1.322 | 1.302 | 1.264 | 1.278 | 1.262 |
| S' | 0.81 | 0.81 | 0.82 | 0.86 | 0.87 |

As shown in Table 4 and FIGS. 6A, 6B, and 6C, the average surface roughness Ra, the number of circular concentric grooves, and the ratio OR-Mrt are all decreased with an increase in the texturing time. It is thus found that a shorter texturing time achieves excellent characteristics (e.g. a high ratio OR-Mrt) on the magnetic recording medium.

EXAMPLES 6 AND 7

Comparative Examples 2 and 3

The surface of a glass substrate (N5 substrate made by Hoya Corp.) with a nominal dimension of 2.5 inch (outer diameter of 6.5 cm)×0.35 mm thickness as follows:

Example 6: a substrate is prepared in the same manner as in Example 1, twenty-nine circular concentric grooves are formed per unit length by texturing the surface of a substrate for twenty seconds, by pressing a machining pad produced. In particular, polyester extra fine fibers are woven (with a diameter of about 1.5 μm) including no abrasive grains against the surface of the substrate with a pressure of 78.5 kPa with the drop of a slurry containing diamond grains (with a mean particle diameter of 1.5 μm and a concentration of 1 weight %));

Example 7: a substrate is prepared in the same manner as in Example 3, eighteen circular concentric grooves are formed per unit length by texturing the surface of a substrate for sixty seconds by pressing a machining pad produced. In particular, polyester extra fine fibers are woven (with a diameter of about 1.5 μm) including no abrasive grains against the surface of the substrate with a pressure of 29 kPa with the drop of a slurry containing diamond grains (with a mean particle diameter of 1.5 μm and a concentration of 1 weight %));

In Comparative Example 2: a substrate is prepared in the same manner as in the Example 4, a small number of grooves, i.e. five concentric grooves are formed per unit length by machining the surface of a substrate for sixty seconds, by pressing a tape made of urethane foam against the surface of the substrate with a pressure of 9.81 kPa with the drop of a slurry containing cerium oxide grains (with a mean particle diameter of 1.5 μm and a concentration of 1 weight %)); and in Comparative Example 3: the surface of a substrate is not machined.

The substrates thus machined are cleaned, and a CrW seed layer (CrW$_{16}$ with a thickness of 2 nm) and a NiP seed layer (NiP$_{28.6}$ with a thickness of 15 nm) are laminated over the substrates by a DC sputtering machine. The substrates are then heated to form a under layer including Cr (with a thickness of 5 nm) and CrMo$_{25}$ (with a thickness of 5 nm), a magnetic layer (with a thickness of 12 nm) containing CoCrPt, and a C protective layer (4 nm). Between the step of forming the NiP seed layer and the step of forming the under layer, the seed layer is exposed to an Ar+O$_2$ mixed gas containing oxygen (O$_2$) (O$_2$ flow rate of 2 volume % based on the flow rate of Ar, total pressure of 1.3 Pa (10 mTorr), exposure time of 2.5 seconds). The magnetic characteristics of magnetic recording media acquired in the above-described examples and the comparative examples are evaluated using an ORM measuring instrument. Table 6 shows the evaluated magnetic characteristics.

| NiP Sputtering Conditions | |
|---|---|
| Back pressure | <1.33 × 10$^{-5}$ Pa (1 × 10$^{-7}$ Torr) |
| Heating conditions | 200° C. |
| Deposition rate | 1 to 6 nm/s (the target size is a diameter of 152.4 mm) |

| | Ex. 6 | Ex. 7 | Com. Ex. 2 | Com. Ex. 3 |
|---|---|---|---|---|
| Number of circular concentric grooves per unit length (1 μm) | 29 | 18 | 5 | 0 |
| Hcr (Oe) | 3370 | 3450 | 3070 | 3180 |
| Mrt_Cir (memu/cm$^2$) | 0.36 | 0.34 | 0.33 | 0.31 |
| OR-Mrt | 1.28 | 1.12 | 1.02 | 0.98 |
| S' | 0.76 | 0.76 | 0.68 | 0.70 |

In a case where the circular concentric pointed grooves are formed by texturing the substrate as described above, the ratio OR-Mrt is higher than 1.1 and the value S' is equal to or greater than 0.74 as desired. In particular, a higher ratio OR-Mrt is exhibited for a larger number of grooves per unit length.

The following read write characteristics of the substrates are then evaluated: TAA: Track Average Amplitude (unit: mVp-p), value LF-TAA in a low frequency (LF) range, and value HF-TAA in a high frequency (HF range) are measured; D50: recording density (unit: kFCI) at which a isolation pulse output is reduced by half during low-frequency recording; Pw50: pulse width (unit: ns); NLTS: non-linear transition shift that is preferably small; and Modulation:

$$Pos.=(TAA_p-TAA)*100/TAA(\%)$$

$$Neg.=(TAA_n-TAA)*100/TAA(\%)$$

TAAp: maximum of track amplitude, TAAn=minimum of track amplitude Noise:

$$Noise=\sqrt{Nt^2-Nh^2-Nc^2}$$

an integrated Noise of read signal at high frequency (Nt),
an integrated Noise caused by head (Nh),
an integrated Noise caused by a circuit (Nc)

SNR: signal-to-noise ratio (unit: dB) that is a logarismic ratio of an integrated value of a recorded signal part of the noise;

$$SNR=20\ Log(TAA\text{-}HF/2\ Noise)$$

Resolution: a percentage of an MF output with respect to an LF output; and

Noise/LF: a value that is standardized using the value LF-TAA to be used for comparison of noise characteristics between different magnetic media, having different Mrt.

Table 7 and Table 8 show the evaluated read write characteristics. As is apparent from these tables, in the Examples 6 and 7 in which the ratio OR-Mrt is 1.1 or higher, the magnetic recording media exhibited the following read write characteristics: a high output (LF-TAA and HF-TAA), high resolution (Res.), high SNR and recording density D50, sharp and pulse width Pw50, and overwrite capability: O/W characteristic that is by no means inferior to those of Comparative examples 2 and 3 in which the ratio OR-Mrt is equal to or smaller than 1.05.

|  | TAA/mVp-p LF HF | | Resolution (%) | D50/kFC1 | Overwrite/ ·dB | Pw50/ns |
|---|---|---|---|---|---|---|
| Ex. 6 | 1.51 | 0.71 | 64.7 | 381 | 37.0 | 11.8 |
| Ex. 7 | 1.47 | 0.70 | 64.5 | 379 | 37.9 | 12.1 |
| Com. Ex. 2 | 1.36 | 0.62 | 63.3 | 372 | 33.0 | 12.4 |
| Com. Ex. 3 | 1.36 | 0.65 | 64.1 | 384 | 37.3 | 12.2 |

|  |  | HF (linear density = 410 kFCl) | | | |
|---|---|---|---|---|---|
|  | NLTS (%) | Modulation (%) Pos. Neg. | | Noise/µV | SNR/dB | Noise/LF (×0.001) |
| Ex. 6 | 2.1 | 7.3 | 3.3 | 88.7 | 12.0 | 58.8 |
| Ex. 7 | 2.1 | 7.5 | 5.2 | 90.8 | 11.7 | 61.8 |
| Com. Ex. 2 | 3.5 | 8.9 | 4.6 | 88.9 | 10.9 | 65.4 |
| Com. Ex. 3 | 2.6 | 9.3 | 3.5 | 94.9 | 10.8 | 69.7 |

Figure 7:
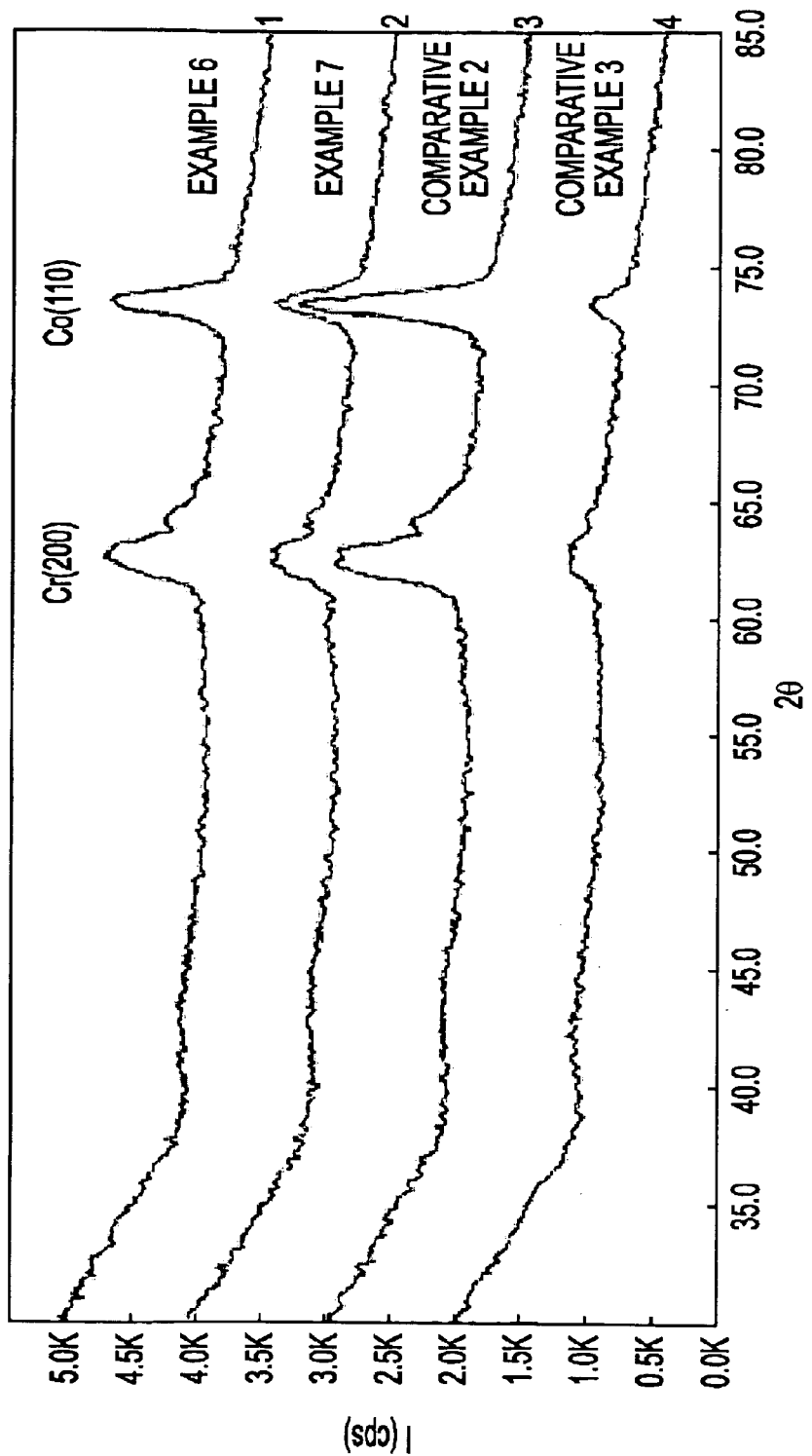
FIG. 7 is a diagram showing an X-ray analysis profile of magnetic layers of magnetic recording media of Examples 6 and 7 and Comparative Examples 2 and 3.

To find the cause, an X-ray analysis based on the θ-2θ method is carried out. FIG. 7 shows an X-ray analysis profile. As is apparent from FIG. 7, an analyzed intensity of Cr (200) and Co (110) is higher in Examples 6 and 7 and Comparative Example 2 than in Comparative Example 3. This suggests that the crystallinity or orientation of particles constituting the magnetic layer is improved by machining the surface of the substrate by texturing or the like. The analyzed intensity is higher in Example 6 than in Comparative Example 2. This is considered to be because the particles in the magnetic layer in Example 6 have a crystal particle diameter equal to or smaller than that of particles in the magnetic layer in Comparative Example 2, even if the influence of X-ray diffusion by surface roughness caused by texturing is taken into consideration. It is thus understood that the magnetic layer having excellent crystallinity and orientation and a fine particle diameter are produced in Example 6 in which the surface of the substrate is textured, thereby producing the magnetic recording medium with excellent read write characteristics.

Specifically, machining the surface of the substrate by texturing or the like to increase a number of pointed concentric grooves per unit length is important for an increase in the ratio OR-Mrt and the improvement in the magnetic characteristics and the read write characteristics. The surface of the substrate should not only be machined by mechanically texturing as mentioned above, but also may be machined by wet or dry etching, or laser machining using FIB (Focused Ion Beam).

EXAMPLE 8

Comparative Example 4

Figure 8:
FIG. 8 is a TEM observation image of a magnetic recording medium manufactured by a method, according to Example 8 of the present invention.
Figure 9:
FIG. 9 is a TEM observation image of a magnetic recording medium manufactured by a method of Comparative Example 4.

In Example 8 and Comparative Example 4, magnetic recording media are produced in the same manner as in Example 7 and Comparative Example 3 above, except that a seed layer is composed of Cr (with a thickness of 5 nm) and $NiP_{20}$ (with a thickness of 12 nm), an under layer is composed of $CrMo_7$ (with a thickness of 30 nm), and a magnetic layer containing CoCrPt may have a thickness of 16 nm, and a C protective layer may have a thickness of 7 nm. Further, the produced magnetic recording media are observed using a transmission electron microscope (TEM) to measure a mean particle diameter (Mean) of particles and a standard deviation σ thereof. Table 9 shows the magnetic characteristics (Hcr, Mrt_Cir, S', and Or-Mrt) of Example 8 and Comparative Example 4 and the mean particle diameter (Mean) and the standard deviation σ thereof measured by the TEM. FIGS. 8 and 9 show typical images obtained by observation using the TEM in Example 8 and Comparative Example 4. Example 8 exhibited a higher OR-Mrt and a smaller crystal particle diameter. This corresponds to the fact that an SNR is achieved using the textured substrate as in Example 6 above.

|  | Ex. 8 | Com. Ex. 4 |
|---|---|---|
| Hor (Oe) | 3580 | 3550 |
| Mrt_Cir (memu/cm²) | 0.42 | 0.39 |
| Or-Mrt | 1.07 | 1 |
| S' | 0.81 | 0.76 |
| Mean particle diameter: Mean (nm) | 9.4 | 10.3 |
| σ/Mean | 0.37 | 0.35 |

EXAMPLE 9

Figure 10A:
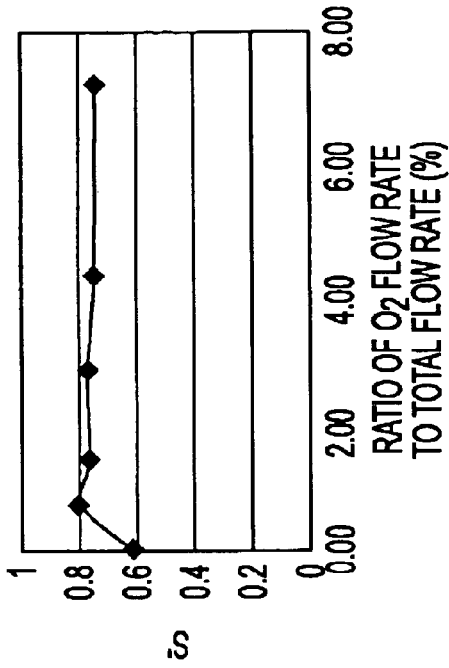
FIG. 10A is a graph showing a dependency of a ratio Mrt_Cir on an oxygen flow rate, according to Example 9 of the present invention.
Figure 10B:
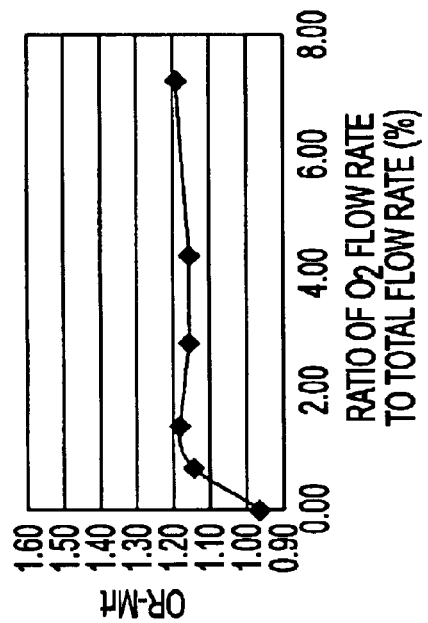
FIG. 10B is graph showing a dependency of a coercive force Hcr on the oxygen flow rate, according to Example 10 of the present invention.
Figure 10C:
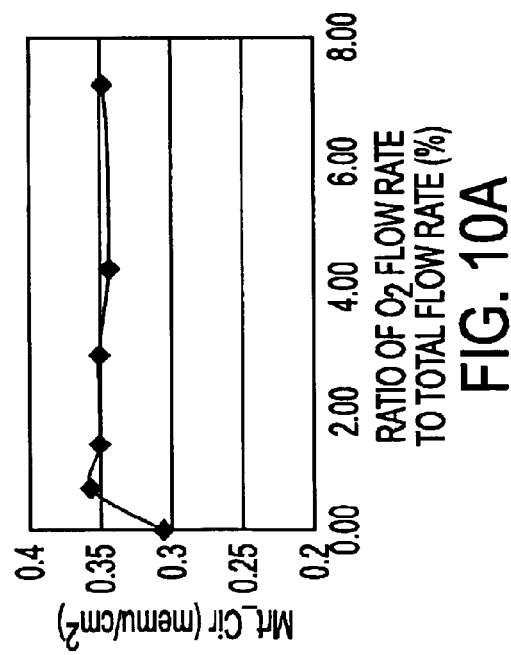
FIG. 10C is graph showing a dependency of the value S' on the oxygen flow rate, according to Example 9 of the present invention.
Figure 10D:
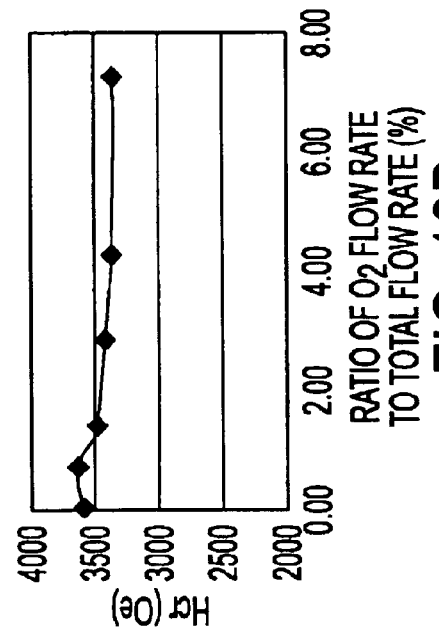
FIG. 10D is a graph showing a dependency of the ratio OR-Mrt on the oxygen flow rate, according to Example 9 of the present invention.

A magnetic recording medium is produced in the same manner as in Example 7 above, except that the oxygen concentration in mixed gas is varied in the step of exposing a seed layer to the mixed gas containing oxygen, and changes in the magnetic characteristics of the magnetic recording medium are observed. More specifically, the oxygen concentration is varied by changing the oxygen flow rate. FIGS. 10A to 10B show changes in the magnetic characteristics according to changes in the oxygen flow rate. FIG. 10A shows a dependency of the ratio Mrt_Cir on the oxygen flow rate. FIG. 10B shows a dependency of the remanent coercive force Hcr on the oxygen flow rate. FIG. 10C shows a dependency of the value S' on the oxygen flow rate. FIG. 10D shows a dependency of the ratio OR-Mrt on the oxygen flow rate. The ratio Mrt_Cir, the value S', and the ratio OR-Mrt increased with a rise in the oxygen flow rate from 0% to 0.7%, becomes saturated in a case where the oxygen flow rate is 7% or higher. The remanent coercive force Hcr is substantially unchanged even if the oxygen flow rate increased from 0% to 0.7%, but decreased by 200 Oe (16 kA/m) in the case where the oxygen flow rate is 7% or higher. This suggests that the ratio OR-Mrt increases in the case where the $Ar+O_2$ mixed gas may have an oxygen flow rate of 0.7% or higher.

EXAMPLE 10

A magnetic recording medium is manufactured in the same manner as in Example 7 above, except that the air is used instead of pure oxygen in a step of exposure to mixed gas containing oxygen, and changes in the magnetic characteristics of the magnetic recording medium are observed. FIGS. 11A to 11B show changes in the magnetic characteristics according to changes in the oxygen flow rate. FIG. 11A shows a dependency of the ratio Mrt_Cir on the oxygen flow rate. FIG. 11B shows a dependency of the remanent coercive force Hcr on the oxygen flow rate, FIG. 11C shows a dependency of the value S' on the oxygen flow rate. FIG. 11D shows a dependency of the ratio OR-Mrt on the oxygen flow rate. The ratio Mrt_Cir, the value S', and the ratio OR-Mrt increased with a rise in the oxygen flow rate from 0% to 2%, but becomes saturated in a case where the oxygen flow rate is higher than 2%. Example 9 exhibited a preferable ratio OR-Mrt of about 1.1 in the case where the air flow rate is held in the range of 2% or higher, but is lower than in Example 9 in which the pure oxygen is used.

Thus, the ratio OR-Mrt is 1.1 or higher in the case where the Ar mixed gas with an airflow rate of 2% or higher is used. Moreover, the remanent coercive force Hcr increased in the case where the air flow rate is held in the range of 2% or higher compared to the case where the air is not used. It is possible to use the Ar mixed gas with a similar composition containing oxygen of not less than 0.4% and nitrogen of not less than 1.6%.

EXAMPLE 11

The magnetic recording medium is produced in the same manner as in Example 7 above, except that the thickness of a seed layer is varied within the range of 0 to 27 nm, and changes in the magnetic characteristics of the magnetic recording medium are observed. FIGS. 12A to 12B show changes in the magnetic characteristics according to changes in the thickness of the seed layer. FIG. 12A shows a dependency of the ratio Mrt_Cir on the thickness of the seed layer, FIG. 12B shows a dependency of the remanent coercive force Hcr on the thickness of the seed layer, FIG. 12C shows a dependency of the value S' on the thickness of the seed layer, and FIG. 12D shows a dependency of the ratio OR-Mrt on the thickness of the seed layer. The ratio Mrt_Cir, the coercive force Hcr, the value S', and the ratio OR-Mrt increased with an increase in the thickness of the seed layer from 0 to 5 nm, but became saturated in the case where the thickness of the seed layer is held in the range between 5 nm and about 20 m. The ratio Mrt_Cir, the coercive force Hcr, and the ratio OR-Mrt slightly decreased in the case where the thickness of the seed layer is changed from not less than 20 nm to 27 nm. Accordingly, ratio OR-Mrt of 1.1 or higher and a relatively high remanent coercive force Hcr can be achieved in the case where the seed layer is composed of NiP and may have a thickness of 5 to 20 nm.

EXAMPLE 12

A magnetic recording medium is produced in the same manner as in Example 7 above, except for the composition of an under layer is changed, and changes in the magnetic characteristics of the magnetic recording medium are observed. More specifically, the first under layer in contact with the seed layer is composed of Cr, and the second under layer in contact with the magnetic layer is composed of $CrMo_{25}$. Changes in the magnetic characteristics of the magnetic recording medium are measured with a thickness of the second under layer being fixed at 5 nm and a thickness of the first under layer being changed from 1 to 8 nm. FIGS. 13A to 13D show changes in the magnetic characteristics according to changes in the thickness of the first under layer. FIG. 13A shows a dependency of the ratio Mrt_Cir on the thickness of the first under layer, FIG. 13B shows a dependency of the remanent coercive force Hcr on the thickness of the first under layer. FIG. 13C shows a dependency of the value S' on the thickness of the first under layer. FIG. 13D shows a dependency of the ratio OR-Mrt on the thickness of the first under layer. The ratio Mrt_Cir, the coercive force Hcr, and the value S' temporarily decrease with an increase in the thickness of the first under layer from 0 to 2 nm, and increase in the case where the thickness of the first under layer is not less than 2 nm. The ratio OR-Mrt increases with an increase in the thickness of the first under layer from 0 to 2.5 nm, and becomes saturated in the case where the thickness of the seed layer is greater than 2.5 nm. Accordingly, the ratio OR-Mrt is as high but not less than 1.1 in the case where the thickness of the first base layer lies inside the range between 3 nm and 8 nm.

EXAMPLE 13

A magnetic recording medium is produced in the same manner as in Example 12 above, except that the thickness of the first under layer (Cr) is fixed at 5 nm and the thickness of the second under layer ($CrMo_{25}$) is changed from 1 to 8 nm. FIGS. 14A to 14D show changes in magnetic characteristics according to changes in the thickness of the second under layer. FIG. 14A shows the dependency of the ratio Mrt_Cir on the thickness of the second under layer. FIG. 14B shows a dependency of the coercive force Hcr on the thickness of the second under layer. FIG. 14C shows a dependency of the value S' on the thickness of the second under layer. FIG. 14D shows a dependency of the ratio OR-Mrt on the thickness of the second under layer. The ratio OR-Mrt increases with an increase in the thickness of the second under layer from 0 to 2.5 nm, and decreases in the case where the thickness of the first under layer is not less than 2 nm. The ratio OR-Mrt increases with an increase in the thickness of the second under layer is greater than 2 nm. The ratio Mrt_Cir, the coercive force Hcr, and the value S' monotonously increase with the increase in the thickness of the second under layer. Accordingly, the value OR-Mrt of 1.1 or higher can be achieved in the case where the thickness of the second under layer lies inside the range between 1 nm and 8 nm.

EXAMPLE 14

A magnetic recording medium is produced in the same manner as in Example 7 above, except that a seed layer is composed of $CrW_{16}$ (with a thickness of 7 nm) and $NiP_{28.6}$ (with a thickness of 21.5 nm) and a base layer is composed of Cr (with a thickness of 7.5 nm) and $CrW_{16}$ (with a thickness of 7.5 nm). The 1.5 nm outermost layer of the seed layer is laminated by reactive sputtering in an atmosphere of an Ar+oxygen mixed gas. In Example 14, changes in the magnetic characteristics of the magnetic recording medium with a change in the oxygen concentration during the reactive sputtering (due to a change in the oxygen flow rate) are observed. FIGS. 15A to 15B show changes in the magnetic characteristics according to changes in the oxygen concentration during the reactive sputtering. FIG. 15A shows a dependency of the ratio Mrt_Cir on the oxygen concentration during the reactive sputtering. FIG. 15B shows a dependency of the remanent coercive force Hcr on the oxygen concentration during the reactive sputtering, FIG. 15C shows a dependency of the value S' on the oxygen concentration during the reactive sputtering. FIG. 15D shows a dependency of the ratio OR-Mrt on oxygen concentration during the reactive sputtering. The ratio OR-Mrt of 1.05 or higher is achieved in the case where the oxygen flow rate is not less than 15%. It is found, however, that the respective characteristic values are lower than in the case where the seed layer is exposed to oxygen after the formation of the seed layer as in Example 7.

EXAMPLE 15

A substrate is machined in a same manner as in Example 1 above, except that a tempered amorphous glass substrate (N10 substrate made by Hoya Corp.) and the substrate are forced with a pressure of 4 kPa (0.85 kgf/cm$^2$). Layers are formed in the same manner as in Example 1, except that a seed layer is composed of $CrW_{16}$ (with a thickness of 2 nm) and $NiP_{20}$ (with a thickness 2 to 28 nm). Under layer is composed of Cr (with a thickness of 3.8 nm) and $CrMo_{25}$ (with a thickness of 2.5 nm). FIGS. 16A to 16D show changes in the magnetic characteristics in accordance with changes in the thickness of the $NiP_{20}$ layer. More specifically, FIGS. 16A, 16B, 16C, and 16D show a dependency of the ratio Mrt__Cir, the remanent coercive force Hcr, the value S', and the ratio OR-Mrt, respectively, on the thickness of the $NiP_{20}$ layer. In the case where $NiP_{20}$ is used, a high ratio OR-Mrt (>1.4), a high remanent coercive force Hcr (>271 kA/m (3400 Oe)), and a high value S' (>0.8) are achieved in the case where the thickness of the $NiP_{20}$ layer is in the range between 2 nm and 28 nm. In particular, an extremely high ratio OR-Mrt (>1.5) is achieved in the case where the thickness of the $NiP_{20}$ layer is in the range between 17 nm and 28 nm.

EXAMPLES 16 AND 17

The surface of a glass substrate (N5 substrate made by Hoya Corp.) is machined as follows:

In Example 16, the surface of the substrate is machined in the same manner as in Example 1, except that the machining pad is pressed against the substrate with a pressure of 83.4 kPa (0.85 kgf/cm$^2$); and in Example 17, the surface of the substrate is machined in the same manner as in Example 1, except that the machining pad is pressed against the substrate with a pressure of 245 kPa (2.5 kgf/cm$^2$).

Magnetic recording media in Examples 16 and 17 are produced by the same film formation procedure as in Example 1, except that a NiP seed layer is composed of $NiP_{20}$ (with a thickness of 20 nm). Further, the magnetic recording media thus manufactured are observed using a transmission electron microscope (TEM) to measure the mean particle diameter (Mean) of particles and the standard deviation σ thereof. Table 10 shows the magnetic characteristics (Hcr, Mrt__Cir, S', and Or-Mrt) of Examples 16 and 17 and a mean particle diameter (Mean) of particles and the standard deviation σ thereof measured by the TEM. FIGS. 17 and 18 show images obtained by observation using the TEM in Examples 16 and 17. Examples 16 and 17 exhibited a high remanent coercive force Hcr even though there is a difference of about 20 kA/m (250 Oe) in the remanent coercive force Hcr. In any case, Examples 16 and 17 exhibited a high ratio OR-Mrt (>1.4) and a great value S' (>0.8). Further, the mean particle diameter (Mean) of the particles and the standard deviation σ thereof are not greatly changed even if the ratio OR-Mrt depending on the number of grooves per 1 μm increased from 1.37 to 1.54.

|  | Ex. 17 | Ex. 18 |
|---|---|---|
| Hcr (Oe) | 3260 | 3510 |
| Mrt__Cir (memu/cm$^2$) | 0.40 | 0.41 |
| Or-Mrt | 1.54 | 1.37 |
| S' | 0.85 | 0.85 |
| Mean particle diameter: Mean (nm) | 8.7 | 8.1 |
| σ/Mean | 2.46 | 2.47 |

In the method of manufacturing the magnetic recording medium using the non-magnetic substrate made of the glass material, the surface of the glass is directly textured using the slurry containing the abrasive grains such as diamond, aluminum oxide, cerium oxide, silicon carbide, or colloidal silica. Weaving extra fine fibers produces the machining pad, such as a woven cloth, or a raised cloth produced by raising the woven cloth may be used, so that extra fine uneven grooves can be formed on the surface of the glass. It is therefore possible to provide the anistropic magnetic recording medium made of the glass material by using the textured substrate.

Further, the substrate thus textured is exposed to the mixed gas containing the oxygen between the step of forming the seed layer and the step of forming the base layer. Thus, it is possible to provide the magnetic recording medium with improved magnetic characteristics and read write characteristics. Further, because the method, according to exemplary embodiments of the present invention, does not require an increase in the number of method steps, the magnetic recording medium capable of handling a high recording density can be manufactured at a low cost.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of manufacturing a magnetic recording medium comprising:

directly texturing a surface of a non-magnetic substrate made of a glass material to form circular concentric grooves thereon;

forming a seed layer on the non-magnetic substrate;

forming an under layer on the seed layer;

forming a magnetic layer on the under layer; and forming a protective layer on the magnetic layer, wherein the textured non-magnetic substrate has at least five circular concentric grooves per 1 square um span on the surface thereof, and has an average surface roughness Ra of 0.2 to 1 nm, exposing the seed layer to a mixed gas comprising an inert gas and oxygen prior to forming the under layer, and a ratio of an in-plane remanent magnetization in a circumferential direction of the magnetic recording medium to an in-plane remanent magnetization in a radial direction of the magnetic recording medium is equal to or greater than 1.05.

2. The method of manufacturing a magnetic recording medium according to claim 1, wherein a slurry comprises abrasive grains comprising at least one of diamond, aluminum oxide, cerium oxide, silicon carbide, and colloidal silica to texture the non-magnetic substrate.

3. The method of manufacturing a magnetic recording medium according to claim 2, wherein the abrasive grains have a mean particle diameter of 0.01 to 2 μm.

4. The method of manufacturing a magnetic recording medium according to claim 2, wherein the abrasive grains in the slurry have a concentration of 0.01 to 5 weight %.

5. The method of manufacturing a magnetic recording medium according to claim 1, wherein a machining pad excluding abrasive grains and made of a material comprising at least one of urethane, polyester, and nylon is forced against the non-magnetic substrate, where the machining pad rubs the non-magnetic substrate.

6. The method of manufacturing a magnetic recording medium according to claim 5, wherein the machining pad comprises a woven cloth produced by weaving extra fine fibers with a diameter of less than or equal to 10 μm, and a raised cloth formed by raising the woven cloth.

7. The method of manufacturing a magnetic recording medium according to claim 5, wherein the machining pad is forced against the non-magnetic substrate with a pressure of 9.8 to 196 kPa.

8. The method of manufacturing a magnetic recording medium according to claim 1, wherein the mixed gas comprises the oxygen of at least 0.7 volume %.

9. The method of manufacturing a magnetic recording medium according to claim 1, further comprising:

exposing the seed layer to a mixed gas comprising an inert gas and air prior to forming the under layer, wherein the mixed gas comprises the air of at least 2 volume %.

10. The method of manufacturing a magnetic recording medium according to claim 1, further comprising:

exposing the seed layer to a mixed gas comprising an inert gas, nitrogen, and oxygen prior to forming the under layer, wherein the mixed gas comprises the nitrogen of at least 1.6 volume % and the oxygen of at least 0.4 volume %.

11. A method of manufacturing a magnetic recording medium comprising:

directly texturing a surface of a non-magnetic substrate made of a glass material to form circular concentric grooves thereon;

forming a seed layer on the non-magnetic substrate;

forming an under layer on the seed layer;

forming a magnetic layer on the under layer; and forming a protective layer on the magnetic layer, wherein
the textured non-magnetic substrate has at least five circular concentric grooves per 1 square μm span on the surface thereof, and has an average surface roughness Ra of 0.2 to mm a ratio of an in-plane remanent magnetization in a circumferential direction of the magnetic recording medium to an in-plane remanent magnetization in a radial direction of the magnetic recording medium is equal to or greater than 1.05, and the forming of the seed layer further comprises forming a portion at a depth of 0.8 to 3 nm from a surface of the seed layer by reactive sputtering in a mixed gas comprising oxygen of at least 1% in inert gas.

12. The method of manufacturing a magnetic recording medium according to claim 11, wherein the forming of the seed layer further comprises forming a portion at a depth of 0.8 to 3 nm from a surface of the seed layer by reactive sputtering in a mixed gas comprising air of at least 3% in inert gas.

13. The method of manufacturing a magnetic recording medium according to claim 11, wherein the forming of the seed layer further comprises forming a portion at a depth of 0.8 to 3 nm from a surface of the seed layer by reactive sputtering in a mixed gas comprising nitrogen of at least 2.4% and oxygen of at least 0.6% in inert gas.

14. The method of manufacturing a magnetic recording medium according to claim 1, wherein the seed layer comprises NiP.

15. The method of manufacturing a magnetic recording medium according to claim 14, wherein the NIP contains P of 19 to 33 atomic %.

16. The method of manufacturing a magnetic recording medium according to claim 14, wherein the seed layer has a thickness of 5 to 28 nm.

17. The method of manufacturing a magnetic recording medium according to claim 1, wherein the under layer comprises a first under layer and a second under layer, the first under layer having a thickness of 3 to 8 nm and the second under layer having a thickness of 1 to 8 nm.

* * * * *

UNITED STATES PATENT AND TRADEMARK OFFICE
CERTIFICATE OF CORRECTION

PATENT NO. : 6,849,164 B2
DATED : February 1, 2005
INVENTOR(S) : Toyoji Ataka et al.

It is certified that error appears in the above-identified patent and that said Letters Patent is hereby corrected as shown below:

Column 20,
Line 55, change "um" to -- $\mu$m --.

Column 22,
Line 8, change "0.2 to mm" to -- 0.2 to 1nm --;
Line 13, after "and" insert paragraph return;
Line 34, change "NIP" to -- NiP --.

Signed and Sealed this

Ninth Day of August, 2005

JON W. DUDAS
*Director of the United States Patent and Trademark Office*